US008201934B2

(12) United States Patent
Kawakami et al.

(10) Patent No.: US 8,201,934 B2
(45) Date of Patent: *Jun. 19, 2012

(54) INKJET RECORDING METHOD

(75) Inventors: Hiroshi Kawakami, Shizuoka-ken (JP); Teppei Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 12/573,896

(22) Filed: Oct. 6, 2009

(65) Prior Publication Data

US 2010/0091055 A1 Apr. 15, 2010

(30) Foreign Application Priority Data

Oct. 15, 2008 (JP) ................................ 2008-266256

(51) Int. Cl.
*G01D 11/00* (2006.01)

(52) U.S. Cl. ........................................................ 347/100

(58) Field of Classification Search ................ 347/9, 68, 347/96, 98–100; 106/31.27, 31.6; 427/256
See application file for complete search history.

(56) References Cited

U.S. PATENT DOCUMENTS

| | | | | |
|---|---|---|---|---|
| 5,378,574 | A | 1/1995 | Winnik et al. | |
| 6,264,730 | B1 * | 7/2001 | Matsumura et al. | 106/31.43 |
| 7,344,235 | B2 * | 3/2008 | Soga et al. | 347/100 |
| 2007/0196597 | A1 | 8/2007 | Shiratsuchi et al. | |
| 2008/0043079 | A1 | 2/2008 | Ikeda et al. | |

FOREIGN PATENT DOCUMENTS

| | | | |
|---|---|---|---|
| JP | 63-041152 | A | 2/1988 |
| JP | 1-108056 | A | 4/1989 |
| JP | 8-170041 | A | 7/1996 |
| JP | 9-194780 | A | 7/1997 |
| JP | 2000-247022 | A | 9/2000 |
| JP | 2000-512233 | A | 9/2000 |
| JP | 2003-505281 | A | 2/2003 |
| JP | 2004-189870 | A | 7/2004 |
| JP | 2005-336489 | A | 12/2005 |
| JP | 2006-131751 | A | 5/2006 |
| JP | 2006-181954 | A | 7/2006 |
| JP | 2006-206686 | A | 8/2006 |
| JP | 2006-249242 | A | 9/2006 |
| JP | 2007-106110 | A | 4/2007 |
| JP | 2007-169528 | A | 7/2007 |
| JP | 2008-260926 | A | 10/2008 |

* cited by examiner

*Primary Examiner* — An Do
(74) *Attorney, Agent, or Firm* — SOLARIS Intellectual Property Group, PLLC

(57) ABSTRACT

An inkjet recording method recording on an inkjet recording medium having an ink receiving layer containing at least inorganic microparticles, a water-soluble resin and a crosslinking agent, by ejecting (1) an inkjet ink containing at least a dye, water and a water-soluble organic solvent, wherein 50% by weight or more of the water-soluble organic solvent is a solvent which gives a swelling ratio of 3% or less for the water-soluble resin crosslinked by the crosslinking agent, using (2) an image forming apparatus equipped with an ink circulating apparatus including:

(i) a plurality of liquid droplet ejecting elements, (ii) a common flow channel, and (iii) a common circulation channel, wherein the inkjet ink is supplied from the common flow channel to the plurality of liquid droplet ejecting elements, and circulates to the common circulation channel. The inkjet recording method gives a sharp and high-density printing, and is excellent in ejection stability.

7 Claims, 4 Drawing Sheets

INKJET RECORDING METHOD

CROSS-REFERENCE TO RELATED APPLICATION

This application claims priority under 35 USC 119 from Japanese Patent Application No. 2008-266256 filed on Oct. 15, 2008, the disclosure of which is incorporated by reference herein.

BACKGROUND OF THE INVENTION

1. Field of the Invention

The present invention relates to an inkjet recording method.

2. Description of the Related Art

Along with the rapid development of information technology industries in recent years, various information processing systems have been developed, and at the same time, recording methods and recording apparatuses that are pertinent to the respective information processing systems are also being put to practical use. Among these, inkjet recording methods have been widely used because of the advantages in that recording is possible on various materials to be recorded, that the hardware (apparatus) is relatively inexpensive and compact, and that the methods are excellent in quietness. Furthermore, in recording performed using an inkjet recording method, it is even possible to obtain so-called photograph-like high-quality recorded matter.

In recent years, recording media in which an ink receiving layer has a porous structure are being increasingly put to practical use. It is described that these recording media have excellent rapid-drying properties and give high glossiness.

However, the demand for high image quality is increasing more and more, and therefore, an inkjet recording medium capable of producing even clearer high-quality images (with high density) and also having excellent storability, is desired.

As for printing methods for obtaining high-density images, for example, Japanese Patent Application Laid-Open (JP-A) No. 2000-247022 and JP-A No. 2006-181954 disclose methods for obtaining high-density recorded images by regulating the pore size of the ink receiving layer.

Furthermore, various investigations to find other methods to obtain high-density images are also being conducted with respect to the inkjet ink. For example, JP-A No. 2005-336489 describes a method of obtaining printed images having high density by controlling the content or type of a water-soluble organic solvent contained in the ink.

On the other hand, in the inkjet recording system, when an ink containing a solvent that is easy to volatile under the temperature and humidity conditions of usage (for example, an ink making use of water as a solvent, or the like), or an ink containing large amounts of dispersed insoluble components or polymer compounds (for example, an ink making use of a pigment or a resin microparticle dispersion, or the like) is used, there occurs a phenomenon in which the solvent in the ink volatiles from the nozzles during printing or while waiting to print, to cause lowering of the solvent concentration in the ink around the nozzles, and the ink viscosity increases. In the case where the ink viscosity around the nozzles increases, fluid resistance increases inside the nozzles, so that ejection failure occurs, such as a fluctuation in the volume of flight or direction of flight of the ejected ink droplets, or stopping of ejection. As a result, a shift in the dot position on the printing medium or an error in the dot size, or even absence of dots may be brought about.

In regard to such problems, JP-A No. 63-41152, JP-A No. 1-108056, Japanese National Phase Publication (Laid-Open) No. 2000-512233, and Japanese National Phase Publication (Laid-Open) No. 2003-505281 propose a technology of constantly circulating the ink of non-ejecting nozzles and ejecting nozzles even during printing, so that a decrease in the concentration of the ink solvent around the nozzles is prevented.

SUMMARY OF THE INVENTION

The present invention has been made in view of the above circumstances and provides an inkjet recording method comprising performing recording on an inkjet recording medium having, on a support, an ink receiving layer containing at least inorganic microparticles, a water-soluble resin and a crosslinking agent, by ejecting (1) an inkjet ink containing at least a dye, water and a water-soluble organic solvent, wherein 50% by weight or more of the water-soluble organic solvent is a water-soluble organic solvent which gives a swelling ratio of 3% or less for the water-soluble resin that has been crosslinked by the crosslinking agent, using (2) an image forming apparatus equipped with an ink circulating apparatus, including:

(i) a plurality of liquid droplet ejecting elements, (ii) a common flow channel which is connected with the plurality of liquid droplet ejecting elements through respective supply channels, and (iii) a common circulation channel which is connected with the plurality of liquid droplet ejecting elements through respective reflux channels, wherein the inkjet ink is supplied from the common flow channel to the plurality of liquid droplet ejecting elements, and circulates to the common circulation channel.

DETAILED DESCRIPTION OF THE INVENTION

Figure 1:
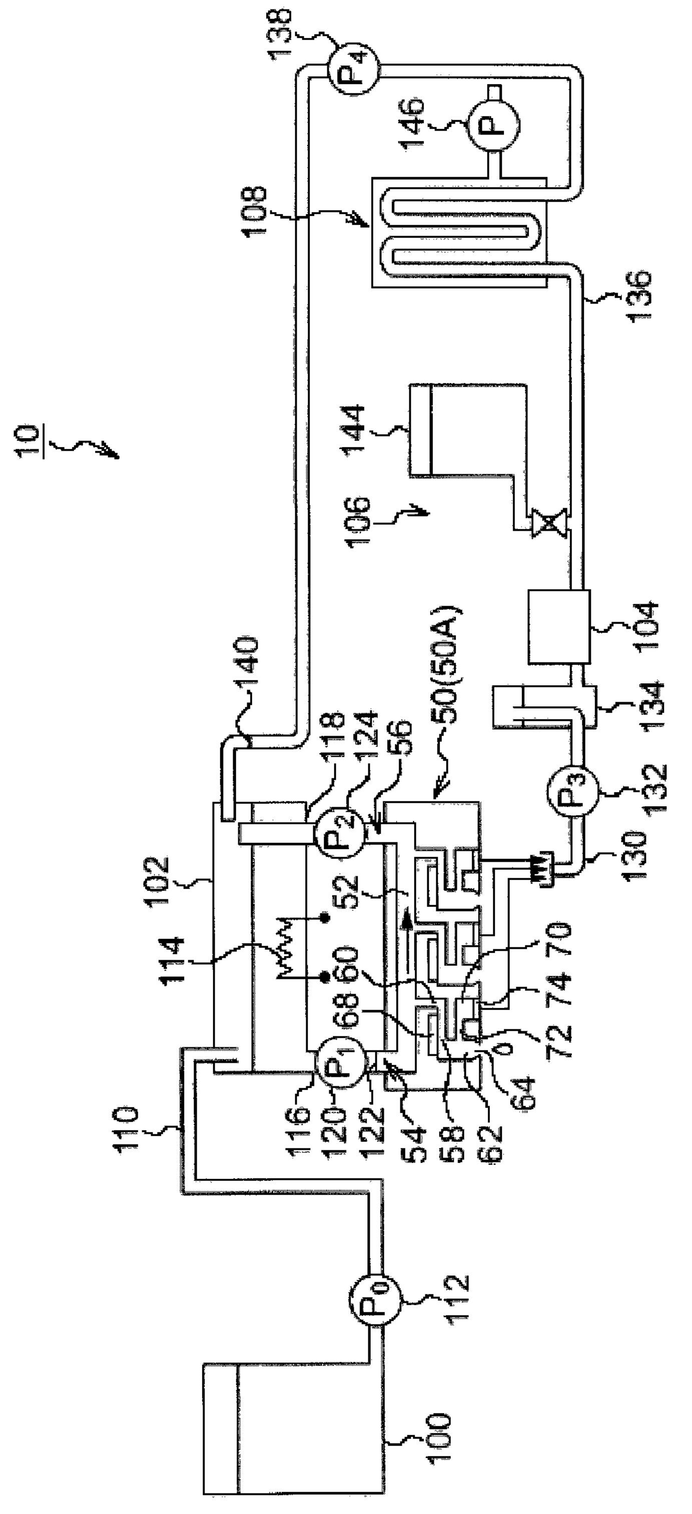
FIG. 1 is a diagram showing the outline of an ink circulation system of an inkjet recording apparatus.

However, both of JP-A Nos. 2000-247022 and 2006-181954 describe only the pore size of the ink receiving layer before performing a printing process, and there is no description regarding a recording method of controlling the pore size of the ink receiving layer after a printing process.

Also, as described in JP-A No. 2005-336489, various investigations are being conducted with respect to inkjet recording methods capable of obtaining high-density recorded images, but in recent years, the current situation is such that the demand in connection with image quality is ever increasing, and even higher-density image quality is demanded.

Furthermore, in spite of the disclosure of JP-A Nos. 63-41152 and 1-108056, and Japanese National Phase Publication (Laid-Open) Nos. 2000-512233 and 2003-505281, these techniques are insufficient in obtaining satisfactory image quality in terms of the resolution and the scratch resistance of images.

In addition to the performance regarding the image quality, there has been a problem in that ejection is unstable, and image irregularities occur in the recorded images, as a problem that is characteristic to inkjet recording methods.

The invention has an object of providing an inkjet recording method which is capable of obtaining sharp and high-density recorded images, and is excellent in ejection stability.

The objects of the invention described above have been solved by an inkjet recording method comprising performing recording on an inkjet recording medium having, on a support, an ink receiving layer containing at least inorganic microparticles, a water-soluble resin and a crosslinking agent, by ejecting (1) an inkjet ink containing at least a dye, water and a water-soluble organic solvent, wherein 50% by weight or more of the water-soluble organic solvent is a water-soluble organic solvent which gives a swelling ratio of 3% or less for the water-soluble resin that has been crosslinked by the crosslinking agent, using (2) an image forming apparatus equipped with an ink circulating apparatus, including:

(i) a plurality of liquid droplet ejecting elements, (ii) a common flow channel which is connected with the plurality of liquid droplet ejecting elements through respective supply channels, and (iii) a common circulation channel which is connected with the plurality of liquid droplet ejecting elements through respective reflux channels, wherein the inkjet ink is supplied from the common flow channel to the plurality of liquid droplet ejecting elements, and circulates to the common circulation channel.

Preferably, a total content of the water-soluble organic solvent is 5% by weight to 25% by weight relative to the total weight of the inkjet ink.

Preferably, the water-soluble organic solvent which gives the swelling ratio of 3% or less is at least one selected from the group consisting of 1,2-alkanediol, ethylene glycol monoalkyl ether, diethylene glycol monoalkyl ether, propylene glycol monoalkyl ether, dipropylene glycol monoalkyl ether, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

Preferably, the inkjet ink further contains a water-soluble polymer thickening agent at a proportion of 0.01% by weight to 5% by weight relative to the total weight of the inkjet ink.

Preferably, the inkjet ink is ejected by being supplied from the common flow channel through the supply channels to the plurality of liquid droplet ejecting elements each having a nozzle, and the inkjet ink which is not ejected from the nozzle is circulated to the common circulation channel through each of the reflux channels.

Preferably, a supply amount of the inkjet ink is controlled by altering the difference in the pressure of the inkjet ink at the common flow channel and at the common circulation channel.

Preferably, each of the supply channels is connected with a pressure chamber which alters the difference in the pressure of the inkjet ink at the common flow channel and at the common circulation channel, and each of the reflux channels is connected to a nozzle flow channel which is connected with the pressure chamber and the nozzle.

The invention provides an inkjet recording method which is capable of obtaining sharp and high-density recorded images, and is excellent in ejection stability.

The inkjet recording method of the present invention is characterized to perform recording on an inkjet recording medium having, on a support, an ink receiving layer containing at least inorganic microparticles, a water-soluble resin and a crosslinking agent, by ejecting (1) an inkjet ink containing at least a dye, water and a water-soluble organic solvent, wherein 50% by weight or more of the water-soluble organic solvent is a water-soluble organic solvent which gives a swelling ratio of 3% or less for the water-soluble resin that has been crosslinked by the crosslinking agent, using (2) an image forming apparatus equipped with an ink circulating apparatus, including:

(i) a plurality of liquid droplet ejecting elements, (ii) a common flow channel which is connected with the plurality of liquid droplet ejecting elements through respective supply channels, and (iii) a common circulation channel which is connected with the plurality of liquid droplet ejecting elements through respective reflux channels, wherein the inkjet ink is supplied from the common flow channel to the plurality of liquid droplet ejecting elements, and circulates to the common circulation channel.

By the construction described above in the invention, an inkjet recording method is provided which is capable of obtaining sharp and high-density recorded images, and is excellent in ejection stability.

The mechanism of the realization of effects on ejection stability according to the invention is not clear, but it is thought as follows.

Increasing the content ratio of a water-soluble organic solvent is effective for obtaining high print density and suppressing color changes, but ejectability deteriorates. At the nozzles that are not in use, there occurs a phenomenon that the solvent volatiles while waiting to print, and the ink physical properties, particularly viscosity, undergo an increase. If the ink viscosity around the nozzles increases, ejection failure may occur, such as a fluctuation in the volume of flight or direction of flight of the ejected ink droplets, or even omission of ejection.

An ink with which it is difficult to make an inkjet image receiving layer to swell, utilizes relatively highly hydrophobic water-soluble organic solvents. Therefore, it is suspected that in a state of rest, microscopic phase separation is prone to occur at the water-repelling surface of the nozzle plate. It is speculated that because of this phenomenon, the nozzle plate surface becomes non-homogeneous, and therefore, ejection failure is likely to occur; however, when a head having a circulating mechanism is used, the physical flow resulting therefrom allows the occurrence of this phase separation to be suppressed, thereby consequently securing an enhancement in ejection stability.

<Inkjet Ink>

The inkjet ink related to the invention contains at least a dye, water and a water-soluble organic solvent, and may further contain other components, if necessary. The inkjet ink of the invention may be at least one selected from the group consisting of a yellow ink, a magenta ink, a cyan ink and a black ink, or may be composed of an ink set combining these inks Hereinafter, each of the components contained in the inkjet ink related to the invention will be explained.

—Water-Soluble Organic Solvent—

The inkjet ink related to the invention contains a water-soluble organic solvent. According to the invention, it is required that 50% by weight or more of the water-soluble organic solvent contained in the inkjet ink is a water-soluble organic solvent (hereinafter, also referred to as a specific water-soluble organic solvent) which gives a swelling ratio of 3% or less for the water-soluble resin that has been crosslinked by a crosslinking agent and is included in the ink receiving layer to be described later.

Here, the "water-soluble organic solvent which gives a swelling ratio of 3% or less for the water-soluble resin that has been crosslinked by a crosslinking agent" will be explained.

The "crosslinking agent" and "water-soluble resin" in regard to the specific water-soluble organic solvent respectively mean the crosslinking agent and water-soluble resin that are included in the ink receiving layer, which constitutes the inkjet recording medium that will be described later. The swelling ratio of a water-soluble resin that has been crosslinked by a crosslinking agent represents the swelling ratio obtainable when 1 mL of a water-soluble organic solvent contained in the ink that will be used in recording, is added dropwise onto a film of the water-soluble resin that has been crosslinked by the crosslinking agent, and the film is allowed to stand for 5 minutes. The swelling ratio may be determined by the following expression.

(Swelling ratio,%)=(increase in the film thickness due to the dropwise addition of the water-soluble organic solvent)/(film thickness before the dropwise addition of the water-soluble organic solvent)×100

The ratio of the amount of crosslinking agent to the amount of the water-soluble resin in the water-soluble resin film supplied to the measurement of the swelling ratio, is required to be made consistent with the ratio of amount of the crosslinking agent to the amount of water-soluble resin in the ink receiving layer that is actually subjected to printing, in order to bring about a more strict correspondence with respect to the density or the performance such as the color changes occurring from immediately after printing. The thickness of the water-soluble resin film needs to be adjusted to 5 μm to 10 μm. The measurement of the swelling ratio is carried out under an environment of 23° C. and 50% RH. In the measurement of the swelling ratio, a water-soluble resin film that has been conditioned under an environment of 23° C. and 50% RH for two days is used.

If the content of the specific water-soluble organic solvent in the water-soluble organic solvents contained in the inkjet ink is less than 50% by weight, sufficient performance may not be obtained with regard to the print density or the color changes occurring from immediately after printing.

As for the specific water-soluble organic solvent, above all, a water-soluble organic solvent which gives a swelling ratio of 2% or less for a water-soluble resin that has been crosslinked by the crosslinking agent is more preferable; a water-soluble organic solvent which gives the swelling ratio of 1% or less is even more preferable; and a water-soluble organic solvent which gives the swelling ratio of 0.5% or less is particularly preferable. The content of the specific water-soluble organic solvent is more preferably 60% by weight or more, even more preferably 80% by weight or more, and particularly preferably 90% by weight or more, based on the total amount of water-soluble organic solvent contained in the inkjet ink. When an inkjet ink containing a specific amount of the specific water-soluble organic solvent as described above is used, inkjet recorded images having high image densities and suppressed color changes after printing may be obtained.

As for the specific water-soluble organic solvent, a solvent which results in a swelling ratio of 3% or less for a water-soluble resin that has been crosslinked by a crosslinking agent may be selected from among water-soluble organic solvents, and used.

Specific examples of the water-soluble organic solvents include alcohols (for example, methanol, ethanol, propanol, isopropanol, butanol, isobutanol, sec-butanol, t-butanol, pentanol, hexanol, cyclohexanol, and benzyl alcohol); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, propylene glycol monoethyl ether, ethylene glycol dimethyl ether, diethylene glycol dimethyl ether, triethylene glycol dimethyl ether, propylene glycol dimethyl ether, dipropylene glycol dimethyl ether, tripropylene glycol dimethyl ether, ethylene glycol diacetate, ethylene glycol monomethyl ether acetate, triethylene glycol monomethyl ether, triethylene glycol monoethyl ether, and ethylene glycol monophenyl ether); amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

The water-soluble organic solvents may be used alone, or in a combination of two or more species.

Here, the "water-soluble organic solvent" according to the invention refers to an organic solvent which, when mixed with water, does not undergo phase separation and is compatible with water.

The total content of the water-soluble organic solvent in the inkjet ink in the invention is preferably 5% by weight to 70% by weight, more preferably 5% by weight to 50% by weight, even more preferably 5% by weight to 40% by weight, and particularly preferably 5% by weight to 25% by weight.

In the case where the water-soluble resin included in the ink receiving layer that will be described later is, for example, a polyvinyl alcohol, the specific water-soluble organic solvent is preferably at least one selected from the group consisting of 1,2-alkanediol, ethylene glycol monoalkyl ether, diethylene glycol monoalkyl ether, propylene glycol monoalkyl ether, dipropylene glycol monoalkyl ether, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

The 1,2-alkanediol is preferably an alkanediol having an alkylene group having 2 to 6 carbon atoms, and even more preferably, ethylene glycol or 1,2-propanediol from the viewpoint of print density.

The ethylene glycol monoalkyl ether, diethylene glycol monoalkyl ether, propylene glycol monoalkyl ether and dipropylene glycol monoalkyl ether each preferably have an alkyl group having 1 to 5 carbon atoms, and more preferably, are each a monomethyl ether, a monoethyl ether or a monobutyl ether from the viewpoint of print density.

The ethylene glycol dialkyl ether, diethylene glycol dialkyl ether, triethylene glycol dialkyl ether, propylene glycol dialkyl ether, dipropylene glycol dialkyl ether and tripropylene glycol dialkyl ether each preferably have an alkyl group having 1 to 3 carbon atoms from the viewpoint of high print density without impairing the solubility in the ink liquid, and more preferably are each a dimethyl ether.

Even among the water-soluble organic solvents mentioned above, ethylene glycol monomethyl ether, ethylene glycol monoethyl ether, ethylene glycol monobutyl ether, propylene glycol monomethyl ether, propylene glycol monoethyl ether, propylene glycol monobutyl ether, ethylene glycol dimethyl ether, diethylene glycol dimethyl ether, triethylene glycol dimethyl ether, propylene glycol dimethyl ether, dipropylene glycol dimethyl ether, and tripropylene glycol dimethyl ether are particularly preferable, from the viewpoints of the image density and the suppression of the color changes after printing.

—Dye—

The inkjet ink related to the invention further contains at least one dye, in addition to the water-soluble organic solvent. General dyes that can be used for inkjet printing may be used. Examples thereof include dyes that are classified into acidic dyes, direct dyes, reactive dyes, vat dyes, sulfide dyes or food colorants in the Color Index, and in addition to these, dyes that are classified into oil-soluble dyes, basic dyes or the like may also be used.

Examples of the dye include an azo dye, an azomethine dye, a xanthene dye, a quinone dye and the like. Specific examples of dye will be shown below. However, the present invention is not limited to these exemplified compounds.

[C.I. Acid Yellow]

C.I. Acid Yellow Nos. 1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, and 246

[C.I. Acid Orange]

C.I. Acid Orange Nos. 3, 7, 8, 10, 19, 24, 51, 56, 67, 74, 80, 86, 87, 88, 89, 94, 95, 107, 108, 116, 122, 127, 140, 142, 144, 149, 152, 156, 162, 166, and 168

[C.I. Acid Red]

C.I. Acid Red Nos. 1, 6, 8, 9, 13, 18, 27, 35, 37, 52, 54, 57, 73, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415

[C.I. Acid Violet]

C.I. Acid Violet Nos. 17, 19, 21, 42, 43, 47, 48, 49, 54, 66, 78, 90, 97, 102, 109, and 126

[C.I. Acid Blue]

C.I. Acid Blue Nos. 1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, and 350

[C.I. Acid Green]

C.I. Acid Green Nos. 9, 12, 16, 19, 20, 25, 27, 28, 40, 43, 56, 73, 81, 84, 104, 108, and 109

[C.I. Acid Brown]

C.I. Acid Brown Nos. 2, 4, 13, 14, 19, 28, 44, 123, 224, 226, 227, 248, 282, 283, 289, 294, 297, 298, 301, 355, 357, and 413

[C.I. Acid Black]

C.I. Acid Black Nos. 1, 2, 3, 24, 26, 31, 50, 52, 58, 60, 63, 107, 109, 112, 119, 132, 140, 155, 172, 187, 188, 194, 207, and 222

[C.I. Direct Yellow]

C.I. Direct Yellow Nos. 8, 9, 10, 11, 12, 22, 27, 28, 39, 44, 50, 58, 79, 86, 87, 98, 105, 106, 130, 132, 137, 142, 147, and 153

[C.I. Direct Orange]

C.I. Direct Orange Nos. 6, 26, 27, 34, 39, 40, 46, 102, 105, 107, and 118

[C.I. Direct Red]

C.I. Direct Red Nos. 2, 4, 9, 23, 24, 31, 54, 62, 69, 79, 80, 81, 83, 84, 89, 95, 212, 224, 225, 226, 227, 239, 242, 243, and 254

[C.I. Direct Violet]

C.I. Direct Violet Nos. 9, 35, 51, 66, 94, and 95

[C.I. Direct Blue]

C.I. Direct Blue Nos. 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, and 291

[C.I. Direct Green]

C.I. Direct Green Nos. 26, 28, 59, 80, and 85

[C.I. Direct Brown]

C.I. Direct Brown Nos. 44, 106, 115, 195, 209, 210, 222, and 223

[C.I. Direct Black]

C.I. Direct Black Nos. 17, 19, 22, 32, 51, 62, 108, 112, 113, 117, 118, 132, 146, 154, 159, and 169

[C.I. Basic Yellow]

C.I. Basic Yellow Nos. 1, 2, 11, 13, 15, 19, 21, 28, 29, 32, 36, 40, 41, 45, 51, 63, 67, 70, 73, and 91

[C.I. Basic Orange]

C.I. Basic Orange Nos. 2, 21, and 22

[C.I. Basic Red]

C.I. Basic Red Nos. 1, 2, 12, 13, 14, 15, 18, 23, 24, 27, 29, 35, 36, 39, 46, 51, 52, 69, 70, 73, 82, and 109

[C.I. Basic Violet]

C.I. Basic Violet Nos. 1, 3, 7, 10, 11, 15, 16, 21, 27, and 39

[C.I. Basic Blue]

C.I. Basic Blue Nos. 1, 3, 7, 9, 21, 22, 26, 41, 45, 47, 52, 54, 65, 69, 75, 77, 92, 100, 105, 117, 124, 129, 147, and 151

[C.I. Basic Green]

C.I. Basic Green Nos. 1, and 4

[C.I. Basic Brown]

C.I. Basic Brown No. 1

[C.I. Reactive Yellow]

C.I. Reactive Yellow Nos. 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176

[C.I. Reactive Orange]

C.I. Reactive Orange Nos. 1, 4, 5, 7, 11, 12, 13, 15, 16, 20, 30, 35, 56, 64, 67, 69, 70, 72, 74, 82, 84, 86, 87, 91, 92, 93, 95, and 107

[C.I. Reactive Red]

C.I. Reactive Red Nos. 2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, and 235

[C.I. Reactive Violet]

C.I. Reactive Violet Nos. 1, 2, 4, 5, 6, 22, 23, 33, 36, and 38

[C.I. Reactive Blue]

C.I. Reactive Blue Nos. 2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236

[C.I. Reactive Green]

C.I. Reactive Green Nos. 8, 12, 15, 19, and 21

[C.I. Reactive Brown]

C.I. Reactive Brown Nos. 2, 7, 9, 10, 11, 17, 18, 19, 21, 23, 31, 37, 43, and 46

[C.I. Reactive Black]

C.I. Reactive Black Nos. 5, 8, 13, 14, 31, 34, and 39

[C.I. Food Black]

C.I. Food Black Nos. 1 and 2

The magenta dye, cyan dye, black dye and yellow dye that may be used in the inkjet ink related to the invention are preferably those dyes shown below.

Specifically, examples of the magenta dye that may be used in the inkjet ink in the invention include aryl or heterylazo dyes including, for example, phenols, naphthols, anilines or the like as a coupler component; azomethine dyes including, for example, pyrazolones, pyrazolotriazoles or the like as a coupler component; methine dyes such as arylidene dyes, styryl dyes, merocyanine dyes, cyanine dyes or oxonol dyes; carbonium dyes such as diphenylmethane dyes, triphenylmethane dyes or xanthene dyes; quinone dyes such as naphthoquinones, anthraquinones or anthrapyridones; condensed polycyclic dyes such as dioxazine dyes; and the like. However, the present invention is not limited to these exemplified compounds.

The magenta dye is preferably heterocyclic azo dyes. Those dyes described in WO 2002/83795 (pages 35 to 55), WO 2002/83662 (pages 27-42), JP-A No. 2004-149560 (paragraphs [0046] to [0059]), JP-A No. 2004-149561 (paragraphs [0047] to [0060]), and JP-A No. 2007-70573 (paragraphs [0073] to [0082]) are more preferable from the viewpoint of ozone resistance.

Examples of the cyan dye that may be used in the inkjet ink in the invention include aryl or heterylazo dyes including, for example, phenols, naphthols, anilines or the like as a coupler component; azomethine dyes including, for example, phenols, naphthols, heterocyclic rings such as pyrrolotriazoles, or the like as a coupler component; polymethine dyes such as cyanine dyes, oxonol dyes or merocyanine dyes; carbonium dyes such as diphenylmethane dyes, triphenylmethane dyes or xanthene dyes; phthalocyanine dyes; anthraquinone dyes; indigo/thioindigo dyes; and the like. However, the present invention is not limited to these exemplified compounds.

Associative phthalocyanine dyes are preferable, and those dyes described in WO 2002/60994, WO 2003/00811, WO 2003/62324, JP-A Nos. 2003-213167, 2004-75986, 2004-323605, 2004-315758, 2004-315807, 2005-179469, and 2007-70573 (paragraphs [0083] to [0090]) are more preferable from the viewpoint of ozone resistance.

Examples of the black dye that may be used in the inkjet ink in the invention include disazo dyes, trisazo dyes, and tetrakisazo dyes. These black dyes may also be used in combination with a pigment such as a dispersion of carbon black.

Preferable examples of the black dye having excellent ozone resistance are described in detail in JP-A No. 2005-307177, and JP-A No. 2006-282795 (paragraphs [0068] to [0087]).

Examples of the yellow dye that may be used in the inkjet ink in the invention include those dyes described in WO 2005/075573, JP-A No. 2004-83903 (paragraphs [0024] to [0062]), JP-A No. 2003-277661 (paragraphs [0021] to [0050]), JP-A No. 2003-277262 (paragraphs [0042] to [0047]), JP-A No. 2003-128953 (paragraphs [0025] to [0076]), JP-A No. 2003-41160 (paragraphs [0028] to [0064]), and U.S. Patent Application Publication No. 2003/0213405 (paragraph [0108]); and C.I. Direct Yellow Nos. 8, 9, 11, 12, 27, 28, 29, 33, 35, 39, 41, 44, 50, 53, 59, 68, 86, 87, 93, 95, 96, 98, 100, 106, 108, 109, 110, 130, 132, 142, 144, 161 and 163; C.I. Acid Yellow Nos. 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Reactive Yellow Nos. 2, 3, 13, 14, 15, 17, 18, 23, 24, 25, 26, 27, 29, 35, 37, 41 and 42; C.I. Basic Yellow Nos. 1, 2, 4, 11, 13, 14, 15, 19, 21, 23, 24, 25, 28, 29, 32, 36, 39 and 40; and the like. The yellow dyes described in JP-A No. 2007-191650, paragraphs [0013] to [0112] and to [0121] are also preferable from the viewpoint of ozone resistance.

The dye used in the inkjet ink in the invention is preferably a water-soluble dye. The water-soluble dye is not particularly limited, and is appropriately selected while the color tone or the like required for the inkjet ink is taken into consideration. A water-soluble dye refers to a dye which dissolves in an amount of 0.2 g or more in 100 mL of water solvent (at 25° C.).

When the inkjet ink in the invention is at least one selected from the group consisting of a yellow ink, a magenta ink, a cyan ink and a black ink, the magenta dye and the cyan dye which are contained respectively in inkjet ink are all anionic water-soluble dyes, and the water-soluble group of the anionic water-soluble dyes is a sulfonic acid group, and may have an $Li^+$ ion or a quaternary ammonium ion as a counterion.

In other words, according to the invention, the water-soluble group of the anionic water-soluble dye in the magenta ink and the cyan ink may be identified with a sulfonic acid group, and the counterion may be identified with an $Li^+$ ion or a quaternary ammonium ion. The most preferable counterion is an $Li^+$ ion.

Similarly, the yellow dye and the black dye contained in a yellow ink and a black ink, respectively, are all anionic water-soluble dyes, and the water-soluble group of the anionic water-soluble dyes is a sulfonic acid group, a carboxyl group or a phenolic hydroxyl group. When the water-soluble group is a sulfonic acid group, it is preferable to use an $Li^+$ ion or a quaternary ammonium ion as the counterion, and when the water-soluble group is a carboxyl group or a phenolic hydroxyl group, it is preferable to use a $K^+$ ion or an $Na^+$ ion as the counterion.

A preferable combination is such that when the water-soluble group is a sulfonic acid group, the counterion is an $Li^+$ ion. When the water-soluble group is a carboxyl group or a phenolic hydroxyl group, the counterion is preferably a $K^+$ ion in order to give priority to the solubility of the dye in water, or the counterion is preferably an $Na^+$ ion in order to give priority to the interaction with the dye having a sulfonic acid group. These are appropriately selected.

As such, there exists the optimal combination for the water-soluble group and the counterion, and since the preferable counterions for the sulfonic acid group and the carboxyl group are different from each other, it is preferable that the dye does not have a sulfonic acid group and a carboxyl group at the same time in the molecule.

The content of the dye contained in the inkjet ink in the invention is preferably 0.5% by weight to 30% by weight, and more preferably 1.0% by weight to 15% by weight. When the content is set at 0.5% by weight or more, the print density becomes satisfactory. Furthermore, when the content is set at 30% by weight or less, an increase in the viscosity of the inkjet ink or the occurrence of the structural viscosity in the viscosity characteristics may be suppressed, so that the ejection stability of the ink ejected from the inkjet head becomes satisfactory.

—Water-Soluble Polymer Thickening Agent—

The inkjet ink of the invention contains at least one water-soluble polymer thickening agent. The water-soluble polymer thickening agent according to the invention may be any compound which causes the viscosity of an aqueous solution prepared by dissolving the compound, to become greater than the viscosity of water, without particular limitation.

In the water-soluble polymer thickening agent according to the invention, the term "water-soluble" means that the solubility (at 25° C.) in 100 g of water is 1 g or greater. The molecular weight of the water-soluble polymer thickening agent in terms of the weight average molecular weight is preferably from 1,800 to 100,000, and more preferably from 3,000 to 50,000. When the weight average molecular weight is within the range of from 1,800 to 100,000, the ejectability of the ink (including re-ejectability after continuous ejection) becomes satisfactory even if the amount of addition is small, and the image quality tends to become satisfactory, without any visible image irregularities.

The water-soluble polymer thickening agent may be any of, for example, vinyl polymers, polyether polymers, polysaccharide polymers, polyacrylic polymers, pyrrolidone polymers, cellulose polymers, and the like.

Specific examples of the water-soluble polymer thickening agent may include gelatins, polyvinyl alcohols, various modified polyvinyl alcohols, polyvinylpyrrolidones, vinyl formals and derivatives thereof, polyoxyalkylene glycols; polymers containing acrylic groups, such as polyacrylamide, polydimethylacrylamide, polydimethyl aminoacrylate, sodium polyacrylate, acrylic acid-methacrylic acid copolymer salts, sodium polymethacrylate, and acrylic acid-vinyl alcohol copolymer salts; natural polymers or derivatives thereof, such as starch, oxidized starch, carboxyl starch, dialdehyde starch, dextrin, sodium alginate, gum arabic, casein, pullulan, dextran, and cellulose or derivatives thereof (for example, methyl cellulose, ethyl cellulose, carboxymethyl cellulose, hydroxypropyl cellulose, and the like); synthetic polymers such as polyethylene glycol, polypropylene glycol, polyvinyl ether, polyglycerin, maleic acid-alkyl vinyl ether copolymers, maleic acid-N-vinylpyrrole copolymers, styrene-maleic anhydride copolymers and polyethyleneimine; polyacrylic acid; and the like.

Among them, from the viewpoints of suppressing the occurrence of curling and enhancing ejection stability, polyvinyl alcohol, polyvinylpyrrolidone, polyoxyalkylene glycols, gelatins, vinyl formals and derivatives thereof; polymers containing acrylic groups, such as acrylic acid-vinyl alcohol copolymer salts; natural polymers or derivatives thereof, such as starch, dextrin, gum arabic, casein, pullulan, dextran, and cellulose or derivatives thereof (for example, methyl cellulose, ethyl cellulose, carboxymethyl cellulose, hydroxypropyl cellulose, and the like); and polyacrylic acid are preferable. Moreover, polyvinyl alcohol, polyvinylpyrrolidone, polyoxyalkylene glycols, and polyacrylic acid are more preferable.

The polyoxyalkylene glycols may be compounds each containing a single kind of oxyalkylene group, or may be compounds each containing two or more kinds of oxyalkylene groups. In the case where a polyoxyalkylene glycol contains two or more kinds of oxyalkylene groups, the compound may be a random copolymer or a block copolymer.

According to the invention, the polyoxyalkylene glycol is preferably at least one of polyoxyethylene glycol, a polyoxyethylene-polyoxypropylene block copolymer, and polyacrylic acid, from the viewpoints of suppressing curling and enhancing ejection stability.

The average degree of polymerization of the polyvinyl alcohols is preferably from 100 to 3500, and more preferably from 120 to 2000, from the viewpoints of suppressing curling and enhancing ejection stability. The degree of saponification of the polyvinyl alcohols is preferably 50% by mole or higher, and more preferably 70% by mole or higher, from the viewpoints of ink dispersion stability.

It is preferable that the water-soluble polymer thickening agent has a weight average molecular weight of 1,800 to 100,000, and is at least one selected from polyvinyl alcohol, polyvinylpyrrolidone, polyoxyethylene glycol, a polyoxyethylene-polyoxypropylene block copolymer, and polyacrylic acid. It is more preferable that the water-soluble polymer thickening agent has a weight average molecular weight of from 3,000 to 50,000, and is at least one selected from polyvinyl alcohol, polyvinylpyrrolidone, polyoxyethylene glycol, a polyoxyethylene-polyoxypropylene block copolymer, and polyacrylic acid.

The water-soluble polymer thickening agent used may be a compound which is synthesized, or a compound which is commercially available. Commercially available products of polyoxyethylene-polyoxypropylene block copolymers include NEWPOL series (trade name: NEWPOL PE-62, 68, 78, 108 and the like, manufactured by Sanyo Chemical Industries, Ltd.), and the like. Commercially available products of polyacrylic acid include JURIMER series (trade name: Jurimer AC-10P, AC-10LP, AC-10S, AC-10LHP, AC-10SHP and the like, manufactured by Nihon Junyaku Co., Ltd.), and the like. Commercially available products of sodium polyacrylate include AQUALIC series (trade name: AQUALIC DL, AQUALIC FH, and the like, manufactured by Nippon Shokubai Co., Ltd.), and the like.

The water-soluble polymer thickening agent in the invention also preferably contains a basic group or an acidic group.

Examples of the basic group may include an amino group which may be substituted, a quaternary ammonium group, and the like. Among them, the basic group is preferably an amino group, from the viewpoints of ink dispersion stability.

Examples of the acidic group may include a carboxyl group, a phosphoric acid group, a phosphonic acid group, a sulfonic acid group, a sulfonamido group, and the like. Among them, the acidic group is preferably a carboxyl group or a sulfonic acid group, from the viewpoints of ink dispersion stability.

The water-soluble polymer thickening agent having a basic group in the invention has at least one basic functional group. Above all, such a polymer thickening agent having an amine value of 10 mg KOH/g or higher is preferable, such an agent having an amine value of 20 mg KOH/g or higher is more preferable, and such an agent having an amine value of 40 mg KOH/g or higher is even more preferable.

The water-soluble polymer thickening agent having an acidic group has at least one acidic functional group. Above all, such a polymer thickening agent having an acid value of 10 mg KOH/g or higher is preferable, such an agent having an acid value of 20 mg KOH/g or higher is more preferable, and such an agent having an acid value of 40 mg KOH/g or higher is even more preferable.

Here, the amine value represents the total amount of primary, secondary and tertiary amines, which are basic groups, and represents the amount of hydrochloric acid required to neutralize all of the basic groups in 1 g of a sample, expressed in the number of milligrams of an equivalent of KOH. Furthermore, the acid value represents the number of milligrams of KOH required to neutralize all of the acidic groups contained in 1 g of a sample.

When the water-soluble polymer thickening agent in the invention contains a basic group, the pH value of the inkjet ink is preferably 7.5 or higher, and more preferably from 8.0 to 9.0, from the viewpoints of ink dispersion stability.

When the water-soluble polymer thickening agent in the invention contains an acidic group, the pH value of the inkjet ink is preferably 6.5 or lower, and more preferably from 5.0 to 6.0, from the viewpoints of ink dispersion stability.

The water-soluble polymer thickening agents in the invention may be used alone, or may be used in a combination of two or more species.

The content of the water-soluble polymer thickening agent in the inkjet ink may be appropriately selected in accordance with the water-soluble polymer thickening agent. For example, the content may be from 0.01% by weight to 20% by weight. Inter alia, from the viewpoints of ejection stability, the content is preferably from 0.01% by weight to 5% by weight, and more preferably from 0.1% by weight to 3.0% by weight.

In addition to the components described above, for the purpose of enhancing the ejection stability of the inkjet ink used in the invention, the print quality, the durability of images or the like, additives such as a surfactant, or a drying preventing agent, a penetration promoting agent, a urea-based additive, a chelating agent, an ultraviolet absorbent, an anti-oxidant, a viscosity adjusting agent, a surface tension adjusting agent, a dispersant, a dispersion stabilizer, an antiseptic, an anti-mold agent, a corrosion inhibitor, a pH adjusting agent, antifoaming agent, a polymeric material, an acid precursor and the like, described in JP-A No. 2004-331871, may be appropriately selected and used. A preferable amount of use of these additives is as described in JP-A No. 2004-331871.

The viscosity at 20° C. of the inkjet ink used in the invention is preferably 2.0 mPa·s to 30 mPa·s from the viewpoint of ejectability. It is more preferable to adjust the viscosity to 2.5 mPa·s to 20 mPa·s, even more preferably to 3.0 mPa·s or more but less than 15 mPa·s, and still more preferably to 3.5 mPa·s or more but less than 12 mPa·s.

For the purpose of adjusting the viscosity as mentioned above, the previously mentioned water-soluble polymer thickening agent may be used. If necessary, another viscosity adjusting agent may also be used in addition. Examples of the viscosity adjusting agent include those celluloses, water-soluble polymers such as polyvinyl alcohol and nonionic surfactants other than the water-soluble polymer thickening agents mentioned above. Further details are described in Chapter 9 of "Viscosity Preparation Technology," (Technical Information Institute Co., Ltd., 1999), and on pages 162 to 174 of "Chemicals for Inkjet Printers ('98 augmented edition)—Survey on Trend and Prospect of Material Development" (CMC Publishing Inc., 1997).

In regard to the viscosity, a value obtained by measuring an inkjet ink adjusted to a temperature of 20° C. using an oscillatory viscometer (trade name: DV-II+ VISCOMETER, manufactured by Brookfield Engineering Laboratories, Inc.), under an environment of 20° C. and at a relative humidity of 50%, using a cone-plate system (ϕ35 mm) while maintaining the ink in the form of an undiluted solution, is employed.

Preferable ranges or methods for measurement of ink physical properties such as the pH, electric conductivity, viscosity, static surface tension and dynamic surface tension of the inkjet ink, methods for controlling these properties, and the like are also as described in JP-A No. 2004-331871.

In regard to the method for preparing an inkjet ink, various processes are described in detail in JP-A Nos. 5-148436, 5-295312, 7-97541, 7-82515, 7-118584 and 2004-331871, and these methods may also be used for the preparation of the inkjet ink in the invention.

In the preparation of an inkjet ink, ultrasonic vibration may be applied at a dissolution process of additives such as dyes, and the like, as described in JP-A No. 2004-331871.

Upon preparing an inkjet ink, a process of eliminating solid wastes by filtration, which is carried out after preparing the liquid, is important. The filtration process is also as described in JP-A No. 2004-331871.

<Inkjet Recording Medium>

The inkjet recording medium in the invention includes, on a support, an ink receiving layer containing at least inorganic microparticles, a water-soluble resin and a crosslinking agent, and if necessary, may further includes other layers.

(Water-Soluble Resin)

The ink receiving layer in the invention contains a water-soluble resin.

The term "water-soluble resin" according to the invention refers to a resin which, after going through a heating or cooling process, finally dissolves in an amount of 0.05 g or more in 100 g of water at 20° C., and preferably 0.1 g or more.

Examples of the water-soluble resin include polyvinyl alcohol-based resins, which are resins having a hydroxyl group as a hydrophilic structural unit (polyvinyl alcohol (PVA), acetoacetyl-modified polyvinyl alcohol, cation-modified polyvinyl alcohol, anion-modified polyvinyl alcohol, silanol-modified polyvinyl alcohol, polyvinyl acetal, and the like), cellulose-based resins (methyl cellulose (MC), ethyl cellulose (EC), hydroxyethyl cellulose (HEC), carboxymethyl cellulose (CMC), hydroxypropyl cellulose (HPC), hydroxyethylmethyl cellulose, hydroxypropylmethyl cellulose, and the like), chitins, chitosans, starches, resins having an ether bonding (polyethylene oxide (PEO), polypropylene oxide (PPO), polyethylene glycol (PEG), polyvinyl ether (PVE), and the like), resins having a carbamoyl group (polyacrylamide (PAAM), polyvinyl pyrrolidone (PVP), polyacrylic acid hydrazide, and the like), and the like. There may also be mentioned polyacrylic acid salts, maleic acid resins, alginates, gelatins and the like, each of which has a carboxyl group as a dissociative group.

Among these, polyvinyl alcohol-based resins are preferable, and in particular, polyvinyl alcohol is preferred.

The content of the water-soluble resin is preferably 9% by weight to 40% by weight, and more preferably 12% by weight to 33% by weight, based on the total solids weight of the ink receiving layer, from the viewpoints of preventing a decrease in the film strength or cracking upon drying due to the content being too small, and preventing a decrease in ink absorbability, which occurs when voids become easily clogged up by the resin due to the content being too large, and thereby the porosity is decreased.

The aforementioned water-soluble resin and the inorganic microparticles that will be described later, which mainly constitute the ink receiving layer, may be respectively formed of a single material, or may be a mixture of plural materials.

The number average degree of polymerization of the polyvinyl alcohol-based resin is preferably 1800 or more, and more preferably 2000 or more, from the viewpoint of preventing cracking. In the case of using the resin with silica microparticles, the type of the water-soluble resin becomes important from the viewpoint of transparency. Particularly, in the case of using anhydrous silica, it is preferable to use a polyvinyl alcohol-based resin as the water-soluble resin, and a polyvinyl alcohol-based resin having a saponification degree of 70% to 99% is more preferred.

The polyvinyl alcohol-based resins include derivatives of the above-mentioned specific examples as well, and the polyvinyl alcohol-based resins may be used alone, or in a combination of two or more species.

The polyvinyl alcohol-based resin has a hydroxyl group in its structural unit, and this hydroxyl group and the silanol group at the surface of silica microparticles form a hydrogen bonding, which facilitates the formation of a three-dimensional network structure having secondary particles of the silica microparticles as chain units. It is believed that as a result of the formation of a three-dimensional network structure as such, an ink receiving layer having a porous structure with high porosity may be formed.

In the inkjet recording medium, the porous ink receiving layer obtained as described above, rapidly absorbs ink on account of the capillary phenomenon, and dots having satisfactory circularity without ink blur may be formed.

(Inorganic Microparticles)

The ink receiving layer in the invention contains inorganic microparticles.

Examples of the inorganic microparticles include silica microparticles, colloidal silica, titanium dioxide, barium sulfate, calcium silicate, zeolites, kaolinite, halloysite, mica, talc, calcium carbonate, magnesium carbonate, calcium sulfate, alumina microparticles, boehmite, pseudoboehmite, and the like. Among them, silica microparticles, colloidal silica, alumina microparticles, and pseudoboehmite are preferable, and in particular, gas-phase process silica microparticles are preferred.

Since the silica microparticles have a particularly large specific surface area, the microparticles have high ink absorbability and efficiency of ink retention. Furthermore, since the silica microparticles have a low refractive index, when dispersion carried out to an appropriate micro-scale particle size, the ink receiving layer may be made transparent, and there is an advantage that high color densities and satisfactory coloring properties may be obtained. As such, the fact that the ink receiving layer is transparent, is important not only for the applications wherein transparency is required, such as OHP sheets, but also in the case of applying the ink receiving layer to recording media such as photographic gloss paper, from the viewpoint of obtaining high color densities, satisfactory coloring properties and high glossiness.

An average primary particle size of the inorganic microparticles is preferably 20 nm or less, more preferably 15 nm or less, and particularly preferably 10 nm or less. When the average primary particle size is 20 nm or less, the ink absorbing characteristics may be effectively enhanced, and at the same time, glossiness at the surface of the ink receiving layer may also be increased.

In particular, since silica microparticles have a silanol group at the surface, and the hydrogen bonding between the silanol groups causes the particles to easily adhere to each other, and also owing to the effect of adherence between the particles via the silanol group and the water-soluble resin, when the average primary particle size is 20 nm or less as described above, the ink receiving layer acquires high porosity, and a highly transparent structure may be formed. Thus, ink absorbing characteristics may be effectively enhanced.

In general, silica microparticles are usually roughly classified into wet process particles and dry process (gas-phase process) particles, on the basis of the production method. In the wet process, methods of obtaining hydrated silica by producing activated silica through acid decomposition of silicates, appropriately polymerizing the activated silica, and then subjecting the resultant to aggregation and sedimentation, are mainly conducted. On the other hand, in the gas phase process, methods of obtaining anhydrous silica according to a process based on high temperature gas phase hydrolysis of silicon halide (flame hydrolysis method), or a process of heating, reducing and gasifying silica sand and cokes using an arc in an electric furnace, and oxidizing the resultant with air (arc method), are mainly conducted.

The gas-phase process silica (anhydrous silica microparticles obtained according to a gas phase process) have differences in the density of silanol group, the presence or absence of pores, and the like, as compared with the hydrated silica, and thus exhibit different properties. However, the gas-phase process silica is suitable for forming a three-dimensional structure having high porosity. The reason for this phenomenon is not known; however, it is speculated that in the case of hydrated silica, the density of silanol group at the microparticle surface is as high as 5 to 8 groups/$nm^2$, and the silica microparticles are likely to form compact aggregates (aggregates), whereas in the case of the gas-phase process silica, the density of silanol group at the microparticle surface is as low as 2 to 3 groups/$nm^2$, and therefore, the silica microparticles form sparse, soft aggregates (flocculates), consequently forming a structure with high porosity.

According to the invention, the gas-phase process silica microparticles (anhydrous silica) obtainable by the dry process are preferable, and silica microparticles having a density of silanol group at the microparticle surface of 2 to 3 groups/$nm^2$ are more preferable.

<Content Ratio of Inorganic Microparticles to Water-Soluble Resin (Pb Ratio)>

The content ratio of the inorganic microparticles (preferably, silica microparticles; x) to the water-soluble resin (y) [PB ratio (x/y), amount by weight of the inorganic microparticles relative to 1 part by weight of the water-soluble resin] exerts large influence on the film structure of the ink receiving layer. That is, when the PB ratio is increased, the porosity, pore volume or the surface area (per unit weight) is increased.

Specifically, since an inkjet recording medium may be subjected to receiving stress upon passing through the conveyance system of an inkjet printer, the ink receiving layer needs to have sufficient film strength. Furthermore, in the case of cutting processing the inkjet recording medium into sheets, the ink receiving layer also needs to have sufficient film strength so as to prevent splitting, peeling and the like of the ink receiving layer. Therefore, the PB ratio (x/y) is preferably 4.5 or smaller, from the viewpoint of enhancing the hardness of the ink receiving layer. The PB ratio is more preferably 4.3 or smaller, and particularly preferably 4.15 or smaller.

Although not particularly limited, from the viewpoint of preventing a decrease in the ink absorbability, which occurs when voids are easily clogged up by the resin and thereby the porosity is decreased, the PB ratio is preferably 1.5 or greater, and from the viewpoint of securing high speed ink absorbability in inkjet printers, the PB ratio is more preferably 2 or greater.

For example, when a coating liquid prepared by completely dispersing anhydrous silica microparticles having an average primary particle size of 20 nm or less and a water-soluble resin at a PB ratio (x/y) of 2 to 4.5 in an aqueous solution, is applied on a support, and the coated layer is dried, a three-dimensional network structure having secondary particles of the silica microparticles as chain units is formed, and a transparent porous film having an average pore size of 30 nm or less, a porosity of 50% to 80%, a specific pore volume of 0.5 mL/g or more, and a specific surface area of 100 $m^2$/g or more, may be easily formed.

(Crosslinking Agent)

The ink receiving layer in the invention contains a crosslinking agent.

A preferred embodiment of the ink receiving layer in the invention is such that the layer containing the water-soluble resin further contains a crosslinking agent that is capable of crosslinking the water-soluble resin, and forms a porous layer hardened by a crosslinking reaction between the water-soluble resin and the crosslinking agent. The addition of the crosslinking agent leads to the crosslinking of the water-soluble resin, and thus an ink receiving layer having high hardness may be obtained.

As for the crosslinking agent, it will be favorable to appropriately select a substance that is adequate in the relationship with the water-soluble resin contained in the ink receiving layer. Among them, boron compounds are preferable since the crosslinking reaction occurs rapidly. For example, borax, boric acid, borates (for example, orthoborates, $InBO_3$, $ScBO_3$, $YBO_3$, $LaBO_3$, $Mg_3(BO_3)_2$, and $CO_3(BO_3)_2$), diborates (for example, $Mg_2B_2O_5$ and $CO_2B_2O_5$), metaborates (for example, $LiBO_2$, $Ca(BO_2)_2$, $NaBO_2$, $KBO_2$), tetraborates (for example, $Na_2B_4O_7.10H_2O$), pentaborates (for example, $KB_5O_8.4H_2O$, $CsB_5O_5$), hexaborates (for example, $Ca_2B_6O_{11}.7H_2O$), and the like may be mentioned. Among them, borax, boric acid and borates are preferable from the viewpoint that they can rapidly bring about the crosslinking reaction, and particularly, boric acid is preferred. It is most preferable to use boric acid in combination with polyvinyl alcohol as the water-soluble resin.

As for the crosslinking agent for polyvinyl alcohol, the compounds shown below may also be mentioned as suitable agents, in addition to the boron compounds.

For example, the compounds are aldehyde-based compounds such as formaldehyde, glyoxal, glutaraldehyde and the like; ketone-based compounds such as diacetyl, cyclopentadione and the like; active halogen compounds such as bis(2-chloroethylurea), 2-hydroxy-4,6-dichloro-1,3,5-triazine, 2,4-dichloro-6-s-triazine sodium salt and the like; active vinyl compounds such as divinylsulfonic acid, 1,3-bis(vinylsulfonyl)-2-propanol, N,N'-ethylenebis(vinylsulfonylacetamide), 1,3,5-triacryloyl-hexahydro-s-triazine and the like; N-methylol compounds such as dimethylolurea, methyloldimethylhydantoin and the like; melamine resins (for example, methylolmelamine and alkylated methylolmelamine); epoxy resins;

isocyanate-based compounds such as 1,6-hexamethylene diisocyanate and the like; aziridine compounds described in U.S. Pat. Nos. 3,017,280 and 2,983,611; carboxylmide-based compounds described in U.S. Pat. No. 3,100,704; epoxy-based compounds such as glycerol triglycidyl ether; ethyleneimino-based compounds such as 1,6-hexamethylene-N,N'-bisethyleneurea and the like; halogenated carboxyaldehyde-based compounds such as mucochloric acid, mucophenoxychloric acid and the like; dioxane-based compounds such as 2,3-dihydroxydioxane and the like; metal-containing compounds such as titanium lactate, aluminum sulfate, chrome alum, potassium alum, zirconyl acetate, chromium acetate and the like; polyamine compounds such as tetraethylenepentamine and the like; hydrazide compounds such as adipic acid dihydrazide and the like; low molecular weight compounds or polymers containing two or more oxazoline groups; and the like.

Furthermore, as the crosslinking agent for the water-soluble resin according to the invention, those polyvalent metal compounds listed below are also preferable. A polyvalent metal compound is capable of not only working as a crosslinking agent, but also further enhancing ozone resistance, image blurring and glossiness.

The polyvalent metal compound is preferably a water-soluble compound, and examples thereof include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, ammonium copper (II) chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconyl acetylacetonate, zirconyl acetate, zirconyl sulfate, zirconyl ammonium carbonate, zirconyl stearate, zirconyl octylate, zirconyl nitrate, zirconyl oxychloride, zirconyl hydroxychloride, chromium acetate, chromium sulfate, magnesium sulfate, magnesium chloride hexahydrate, magnesium citrate nonahydrate, sodium phosphotungstate, sodium tungsten citrate, dodecatungstophosphoric acid n-hydrate, dodecatungstosilicic acid 26-hydrate, molybdenum chloride, dodecamolybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate, and the like.

Among them, aluminum-containing compounds (water-soluble aluminum compounds) such as aluminum sulfate, aluminum alum, aluminum sulfite, aluminum thiosulfate, polyaluminum chloride, aluminum nitrate nonahydrate, and aluminum chloride hexahydrate; zirconyl-containing compounds (water-soluble zirconyl compounds) such as zirconyl acetylacetonate, zirconyl acetate, zirconyl sulfate, zirconyl ammonium carbonate, zirconyl stearate, zirconyl octylate, zirconyl nitrate, zirconyl oxychloride, and zirconyl hydroxychloride; and titanium-containing compounds such as titanium tetrachloride, tetraisopropyl titanate, titanium acetylacetonate, and titanium lactate are preferable, and in particular, polyaluminum chloride, zirconyl acetate, zirconyl ammonium carbonate and zirconyl oxychloride are preferred.

Among them, the crosslinking agent according to the invention is particularly preferably boron compounds and zirconyl compounds.

According to the invention, for example, in the case of using polyvinyl alcohol as the water-soluble resin and boric acid as the crosslinking agent, the crosslinking agent is preferably contained in an amount of 5% by weight to 50% by weight, and more preferably 8% by weight to 30% by weight, based on the water-soluble resin, in order to sufficiently obtain the effects of the invention by suppressing swelling of polyvinyl alcohol, without causing problems such as cracking in the ink receiving layer or scratch resistance.

The crosslinking agents described above may be used alone, or in a combination of two or more species. From the viewpoint of working as a suitable crosslinking agent and at the same time, further enhancing ozone resistance, image blurring and glossiness, the polyvalent metal compound (particularly preferably, a zirconyl compound) is incorporated at least in an amount of preferably 0.1% by weight or more, more preferably 0.5% by weight or more, and particularly preferably 1.0% by weight or more, based on the water-soluble resin. Although not particularly limited, the upper limit of the content of the polyvalent metal compound is preferably 50% by weight, from the viewpoints of image density, ink absorbability, suppression of curling of the recording medium, and the like.

(Ammonium Carbonate)

The ink receiving layer in the invention preferably further contains ammonium carbonate. When ammonium carbonate is incorporated into the ink receiving layer, an ink receiving layer having high hardness may be obtained.

The content of ammonium carbonate is preferably 8% by weight or more, more preferably 9% by weight or more, and particularly preferably 11% by weight or more, based on the water-soluble resin. The upper limit is not particularly limited, but from the viewpoints of image density, ink absorbability, suppression of curling of the recording medium and the like, the upper limit is preferably 20% by weight.

(Water-Dispersible Cationic Resin)

As a component of the ink receiving layer in the invention, a water-dispersible cationic resin may be incorporated. The water-dispersible cationic resin is preferably a urethane resin which is a cation-modified self-emulsifying polymer, and preferably has a glass transition temperature of lower than 50° C.

This "cation-modified self-emulsifying polymer" means a polymer compound which is capable of spontaneously forming a stable emulsified dispersion in a water-based dispersion medium, without using any emulsifier or surfactant, or with the addition of a very small amount of emulsifier or surfactant if ever used. From a quantitative aspect, the "cation-modified self-emulsifying polymer" means a polymer having stable emulsion dispersibility at room temperature of 25° C. at a concentration of 0.5% by weight or more, preferably 1% by weight or more, and particularly preferably 3% by weight or more with respect to the water-based dispersion medium.

The "cation-modified self-emulsifying polymer" in the invention may be more specifically, for example, a polymer having a cationic group such as a primary, secondary or tertiary amino group, or a quaternary ammonium group being obtained by an addition polymerization or a condensation polymerization.

Vinyl-polymerized polymers which are effective as the aforementioned polymer, may be, for example, polymers that are obtainable by polymerizing the following vinyl monomers. That is, there may be mentioned acrylic acid esters or methacrylic acid esters (in which the ester group is an alkyl group or an aryl group, all of which may be substituted; for example, a methyl group, an ethyl group, an n-propyl group, an isopropyl group, an n-butyl group, a sec-butyl group, a tert-butyl group, a hexyl group, a 2-ethylhexyl group, a tert-octyl group, a 2-chloroethyl group, a cyanoethyl group, a 2-acetoxyethyl group, a tetrahydrofurfuryl group, a 5-hydroxypentyl group, a cyclohexyl group, a benzyl group, a hydroxyethyl group, a 3-methoxybutyl group, a 2-(2-methoxyethoxy)ethyl group, a 2,2,2-trifluoroethyl group, a 1H,1H,2H,2H-perfluorodecyl group, a phenyl group, a 2,4,5-trimethylphenyl group, a 4-chlorophenyl group, and the like);

vinyl esters, specifically, aliphatic carboxylic acid vinyl esters which may be substituted (for example, vinyl acetate, vinyl propionate, vinyl butylate, vinyl isobutylate, vinyl caproate, vinyl chloroacetate, and the like), aromatic carboxylic acid vinyl esters which may be substituted (for example, vinyl benzoate, vinyl 4-methylbenzoate, vinyl salicylate, and the like);

acrylamides, specifically, acrylamide, N-monosubstituted acrylamide, N-disubstituted acrylamide (the substituent may be an alkyl group, an aryl group or a silyl group, all of which may be substituted; for example, a methyl group, an n-propyl group, an isopropyl group, an n-butyl group, a tert-butyl group, a tert-octyl group, a cyclohexyl group, a benzyl group, a hydroxymethyl group, an alkoxymethyl group, a phenyl group, a 2,4,5-trimethylphenyl group, a 4-chlorophenyl group, a trimethylsilyl group, and the like);

methacrylamides, specifically, methacrylamide, N-monosubstituted methacrylamide, N-disubstituted methacrylamide (the substituent may be an alkyl group, an aryl group or a silyl group, all of which may be substituted; for example, a methyl group, an n-propyl group, an isopropyl group, an n-butyl group, a tert-butyl group, a tert-octyl group, a cyclohexyl group, a benzyl group, a hydroxymethyl group, an alkoxymethyl group, a phenyl group, a 2,4,5-trimethylphenyl group, a 4-chlorophenyl group, a trimethylsilyl group, and the like);

olefins (for example, ethylene, propylene, 1-pentene, vinyl chloride, vinylidene chloride, isoprene, chloroprene, butadiene, and the like), styrenes (for example, styrene, methylstyrene, isopropylstyrene, methoxystyrene, acetoxystyrene, chlorostyrene, and the like), vinyl ethers (for example, methyl vinyl ether, butyl vinyl ether, hexyl vinyl ether, methoxyethyl vinyl ether, and the like); and the like.

Other examples of the vinyl monomer include crotonic acid esters, itaconic acid esters, maleic acid diesters, fumaric acid diesters, methyl vinyl ketone, phenyl vinyl ketone, methoxyethyl vinyl ketone, N-vinyl oxazolidone, N-vinyl pyrrolidone, methylenemalononitrile, diphenyl-2-acryloyloxyethyl phosphate, diphenyl-2-methacryloyloxyethyl phosphate, dibutyl-2-acryloyloxyethyl phosphate, dioctyl-2-methacryloyloxyethyl phosphate, and the like.

As for the monomer having a cationic group, there may be mentioned, for example, a monomer having a tertiary amino group, such as dialkylaminoethyl methacrylate or dialkylaminoethyl acrylate, and the like.

As the polyurethane that may be applied to the cationic group-containing polymer, there may be mentioned, for example, polyurethanes synthesized by an addition polymerization of a variety of combinations of diol compounds and diisocyanate compounds listed below.

Specific examples of the diol compounds include ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycol (average molecular weight=200, 300, 400, 600, 1000, 1500, 4000), polypropylene glycol (average molecular weight=200, 400, 1000), polyester polyol, 4,4'-dihydroxy-diphenyl-2,2-propane, 4,4'-dihydroxyphenylsulfone, and the like.

Specific examples of the diisocyanate compounds include methylene diisocyanate, ethylene diisocyanate, isophoron diisocyanate, hexamethylene diisocyanate, 1,4-cyclohexane diisocyanate, 2,4-toluene diisocyanate, 2,6-toluene diisocyanate, 1,3-xylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, methylenebis(4-cyclohexyl isocyanate), and the like.

The cationic group contained in the cationic group-containing polyurethane includes cationic groups such as primary, secondary and tertiary amines and quaternary ammonium salts. The self-emulsifying polymer used in the aqueous dispersion according to the invention is preferably a urethane resin having a cationic group such as a tertiary amine or a quaternary ammonium salt.

The polyurethane having a cationic group may be obtained by, for example, using a diol such as mentioned above, to which a cationic group has been introduced, in the synthesis of polyurethane. In the case of a quaternary ammonium salt, a polyurethane containing a tertiary amino group may be quaternized with a quaternizing agent.

The diol compounds and diisocyanate compounds that may be used in the synthesis of polyurethane may be used singly, or two or more species, each respectively. The diol compounds and diisocyanate compounds may also be used singly, or two or more species at any proportion, each respectively, in accordance with various purposes (for example, adjustment of the glass transition temperature (Tg) of the polymer, enhancement of solubility, impartation of compatibility with the binder, improvement in stability of the dispersion, and the like).

(Mordant)

The ink receiving layer in the invention preferably contains a mordant such as shown below, for the purpose of further improving the image blur resistance over time, and water resistance. The mordant preferably includes an organic mordant such as a cationic polymer (cationic mordant), and an inorganic mordant such as a water-soluble metal compound. The cationic mordant which is suitably used is a polymer mordant having a primary, secondary or tertiary amino group or a quaternary ammonium group as a cationic functional group. A cationic non-polymer mordant may also be used.

The polymer mordant is preferably a product obtainable as a homopolymer of a monomer having a primary, secondary or tertiary amino group or a salt thereof, or a quaternary ammonium salt group (mordant monomer), or a copolymer or condensation polymer of the mordant monomer with another monomer (non-mordant monomer). Furthermore, these polymer mordants may be used in the form of a water-soluble polymer or water-dispersible latex particles.

Specific examples of the mordant monomer include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride;

trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate;

a quaternization product of N,N-dimethylaminoethyl (meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth) acrylamide, N,N-diethylaminoethyl(meth)acrylamide, N,N-dimethylaminopropyl(meth)acrylamide, or N,N-diethylaminopropyl(meth)acrylamide with methyl chloride, ethyl chloride, methyl bromide, ethyl bromide, methyl iodide or ethyl iodide; or a sulfonate, alkylsulfonate, acetate, alkylcarboxylate or the like obtained by an anion exchange thereof.

Specific examples of the compound include monomethyldiallylammonium chloride, trimethyl-2-(methacryloyloxy) ethylammonium chloride, triethyl-2-(methacryloyloxy)ethylammonium chloride, trimethyl-2-(acryloyloxy) ethylammonium chloride, triethyl-2-(acryloyloxy) ethylammonium chloride, trimethyl-3-(methacryloyloxy) propylammonium chloride, triethyl-3-(methacryloyloxy) propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride;

N,N-dimethyl-N-ethyl-2-(methacryloyloxy)ethylammonium chloride, N,N-diethyl-N-methyl-2-(methacryloyloxy) ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, trimethyl-3-(acryloylamino)propylammonium acetate, and the like. In addition to these, N-vinylimidazole, N-vinyl-2-methylimidazole and the like may also be mentioned as copolymerizable monomers. Furthermore, a product obtained using a polymerization unit such as N-vinylacetamide or N-vinylformamide, by converting the unit into a vinylamine unit by hydrolysis after polymerization, and a salt formed from this product, may also be used.

The non-mordant monomer refers to a monomer which does not contain a basic or cationic moiety such as a primary, secondary or tertiary amino group or a salt thereof, or a quaternary ammonium salt group, and does not exhibit interaction, or exhibits substantially small interaction, with a dye in the inkjet ink. For example, a (meth)acrylic acid alkyl ester; a (meth)acrylic acid cycloalkyl ester such as cyclohexyl (meth)acrylate or the like; a (meth)acrylic acid aryl ester such as phenyl(meth)acrylate or the like; a (meth)acrylic acid aralkyl ester such as benzyl(meth)acrylate or the like; aromatic vinyls such as styrene, vinyltoluene, α-methylstyrene or the like; vinyl esters such as vinyl acetate, vinyl propionate, vinyl versatate or the like; allyl esters such as allyl acetate or the like; halogen-containing monomers such as vinylidene chloride, vinyl chloride or the like; vinyl cyanides such as (meth)acrylonitrile or the like; olefins such as ethylene, propylene or the like; and the like may be mentioned.

The (meth)acrylic acid alkyl ester is preferably a (meth) acrylic acid alkyl ester having an alkyl moiety having 1 to 18 carbon atoms. Specific examples include methyl (meth)acrylate, ethyl(meth)acrylate, propyl(meth)acrylate, isopropyl (meth)acrylate, n-butyl (meth)acrylate, isobutyl(meth)acrylate, t-butyl(meth)acrylate, hexyl(meth)acrylate, octyl (meth) acrylate, 2-ethylhexyl(meth)acrylate, lauryl(meth)acrylate, stearyl(meth)acrylate, and the like. Among these, methyl acrylate, ethyl acrylate, methyl methacrylate, ethyl methacrylate, and hydroxyethyl methacrylate are preferred. These non-mordant monomers may also be used alone, or in a combination of two or more species.

Furthermore, the polymer mordant preferably includes polydiallyldimethylammonium chloride, polymethacryloyloxyethyl-β-hydroxyethyldimethylammonium chloride, polyethyleneimine, a polyamide-polyamine resin, cationized starch, a dicyandiamide-formalin condensate, dimethyl-2-hydroxypropylammonium salt polymerization product, polyamidine, polyvinylamine, a dicyan-based cation resin represented by a dicyandiamide-formalin condensation polymer, a polyamine-based cationic resin represented by a dicyanamide-diethylenetriamine condensation polymer, epichlorohydrin-dimethylamine addition polymerization product, a dimethyldiallylammonium chloride-$SO_2$ copolymer, a diallylamine salt-$SO_2$ copolymer, and the like.

Specific examples of the polymer mordant also include the compounds described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and 1-161236; U.S. Pat. Nos. 2,484,430, 2,548,564, 3,148,061, 3,309,690, 4,115,124, 4,124,386, 4,193,800, 4,273,853, 4,282,305 and 4,450,224; JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777, and 2001-301314; and the like.

The inorganic mordant may be a polyvalent water-soluble metal salt or a hydrophobic metal salt compound other than those mentioned above. For example, a salt or a complex of a metal selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth, may be mentioned.

Specific examples include calcium acetate, calcium chloride, calcium formate, calcium sulfate, barium acetate, barium sulfate, barium phosphate, manganese chloride, manganese acetate, manganese formate dihydrate, manganese ammonium sulfate hexahydrate, cupric chloride, ammonium cupric chloride dihydrate, copper sulfate, cobalt chloride, cobalt thiocyanate, cobalt sulfate, nickel sulfate hexahydrate, nickel chloride hexahydrate, nickel acetate tetrahydrate, nickel ammonium sulfate hexahydrate, nickel amidosulfate tetrahydrate, aluminum sulfate, aluminum alum, basic polyaluminum hydroxide, aluminum sulfite, aluminum thiosulfate, polyaluminum chloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconyl acetate, zirconyl sulfate, zirconyl ammonium carbonate, zirconyl stearate, zirconyl octylate, zirconyl nitrate, zirconium oxychloride, zirconium hydroxychloride, chromium acetate, chromium sulfate, magnesium sulfate, magnesium chloride hexahydrate, magnesium citrate nonahydrate, sodium phosphotungstate, sodium tungsten citrate, dodecatungstophosphoric acid n-hydrate, dodecatungstosilicic acid 26-hydrate, molybdenum chloride, dodecamolybdophosphoric acid n-hydrate, potassium nitrate, manganese nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride, bismuth nitrate, and the like. Among them, aluminum-containing compounds, titanium-containing compounds, zirconium-containing compounds, and compounds (salts or complexes) of the metals belonging to Group IIIB of the Periodic Table are preferable.

The "polyvalent metal compounds" listed in the section of (Crosslinking agent) may also be suitably used as mordants.

When the mordant is added to the ink receiving layer, an addition amount of the mordant is preferably from 0.01 $g/m^2$ to 5 $g/m^2$.

(Other Components)

The ink receiving layer related to the invention is constituted to contain the following components as necessary.

That is, for the purpose of suppressing deterioration of color materials of the ink, the ink receiving layer may contain various color fading preventing agents such as ultraviolet absorbents, antioxidants, singlet oxygen quenchers or the like.

The ultraviolet absorbents may include cinnamic acid derivatives, benzophenone derivatives, benzotriazolylphenol derivatives, and the like. For example, butyl α-cyanophenylcinnamate, o-benzotriazolephenol, o-benzotriazole-p-chlorophenol, o-benzotriazole-2,4-di-t-butylphenol, o-benzotriazole-2,4-di-t-octylphenol, and the like may be mentioned. Hindered phenol compounds may also be used as the ultraviolet absorbent, and specifically, a phenol derivative substituted by one or more branched alkyl groups at least at the 2-position or the 6-position, is preferable.

Benzotriazole-based ultraviolet absorbents, salicylic acid-based ultraviolet absorbents, cyanoacrylate-based ultraviolet absorbents, oxalic acid anilide-based ultraviolet absorbents, and the like may also be used. These ultraviolet absorbents are described in, for example, JP-A Nos. 47-10537, 58-111942, 58-212844, 59-19945, 59-46646, 59-109055 and 63-53544; Japanese Patent Application Publication (JP-B) Nos. 36-10466, 42-26187, 48-30492, 48-31255, 48-41572, 48-54965 and 50-10726; U.S. Pat. Nos. 2,719,086, 3,707,375, 3,754,919 and 4,220,711; and the like.

Fluorescent whitening agents may also be used as ultraviolet absorbents, and for example, coumalin-based fluorescent whitening agents and the like may be mentioned. Specifically, examples are described in JP-B Nos. 45-4699, 54-5324, and the like.

Examples of the antioxidants include those described in EP Nos. 223739, 309401, 309402, 310551, 310552 and 459-416; DE Pat. No. 3,435,443; JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, and 63-113536;

JP-A Nos. 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437 and 5-170361; JP-B Nos. 48-43295 and 48-33212; U.S. Pat. Nos. 4,814,262 and 4,980,275; and the like.

Specific examples of the antioxidants include 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethyl-1,2,3,4-tetrahydroquinoline, 6-ethoxy-1-octyl-2,2,4-trimethyl-1,2,3,4-tetrahydroquinoline, nickel cyclohexanoate, 2,2-bis(4-hydroxyphenyl)propane, 1,1-bis(4-hydroxyphenyl)-2-ethylhexane, 2-methyl-4-methoxydiphenylamine, 1-methyl-2-phenylindole, and the like.

These color fading preventing agents may be used alone, or in a combination of two or more species. The color fading preventing agent may be dissolved in water, dispersed or emulsified, and may also be included in microcapsules. An addition amount of the color fading preventing agent is preferably from 0.01% by weight to 10% by weight of the coating liquid for ink receiving layer.

In the invention, the ink receiving layer preferably contains a high boiling point organic solvent for preventing curling. The high boiling point organic solvent is preferably water-soluble, and examples of the water-soluble high boiling point organic solvent include alcohols such as ethylene glycol, propylene glycol, diethylene glycol, triethylene glycol, glycerin, diethylene glycol monobutyl ether (DEGmBE), triethylene glycol monobutyl ether, glycerin monomethyl ether, 1,2,3-butanetriol, 1,2,4-butanetriol, 1,2,4-pentanetriol, 1,2,6-hexanetriol, thiodiglycol, triethanolamine, and polyethylene glycol (weight average molecular weight being 400 or less). A preferred example is diethylene glycol monobutyl ether (DEGmBE).

The content of the high boiling point organic solvent in the coating liquid for ink receiving layer is preferably from 0.05% by weight to 1% by weight, and particularly preferably from 0.1% by weight to 0.6% by weight.

The coating liquid for ink receiving layer may also contain various inorganic salts, or an acid or alkali as a pH adjusting agent for the purpose of enhancing the dispersibility of the microparticles.

Moreover, metal oxide microparticles having electronic conductivity may be incorporated for the purpose of suppressing frictional electrification or peeling electrification of the surface, and various matting agents may be incorporated for the purpose of reducing the frictional characteristics of the surface.

(Support)

As for the support to be used in the invention, a transparent support formed from a transparent material such as a plastic, and an opaque support formed from an opaque material such as paper may all be used. It is preferable for the support to have a resin layer including a thermoplastic resin such as polyethylene (hereinafter, sometimes simply referred to as "thermoplastic resin-containing layer"), as the outermost layer on the side where the ink receiving layer is provided. The thermoplastic resin-containing layer may also be provided on both sides of a paper substrate in accordance with the purpose or the like.

Next, the thermoplastic resin will be explained.

The thermoplastic resin is not particularly limited, and may be appropriately selected from microgranulation products or latexes of known thermoplastic resins such as polyolefin resins (for example, homopolymers of α-olefins, such as polyethylene or polypropylene, or mixtures thereof), and used. Among them, a polyolefin resin (particularly, polyethylene resin) is preferable as the thermoplastic resin.

The polyolefin resin is not particularly limited in a molecular weight as long as extrusion coating is possible, and may be appropriately selected according to the purpose. Usually, a polyolefin resin having a molecular weight in a range of 20,000 to 200,000 is used.

The polyethylene resin is not particularly limited, and may be appropriately selected according to the purpose. Examples thereof include high density polyethylene (HDPE), low density polyethylene (LDPE), linear low density polyethylene (L-LDPE), and the like.

It is preferable to incorporate a white pigment, a coloring pigment or fluorescent whitening agent, and stabilizers such as phenol, bisphenol, thiobisphenol, amines, benzophenone, a salicylic acid salt, benzotriazole and an organic metal compound.

Examples of the method for forming the thermoplastic resin-containing layer preferably include melt extrusion, wet lamination, dry lamination and the like. Among them, melt extrusion is most preferable. In order to form a thermoplastic resin-containing layer by melt extrusion, for the purpose of strengthening the adhesion between the thermoplastic resin-containing layer and its underlying layer (hereinafter, may be referred to as "coating layer"), it is preferable to provide a preliminary treatment at the surface of the coating layer.

The preliminary treatment may be an acid etching treatment using a sulfuric acid-chromic acid mixed liquid, a flame treatment using a gas flame, an ultraviolet irradiation treatment, a corona discharge treatment, a glow discharge treatment, an anchor coat treatment using alkyl titanate, or the like. The treatment may be appropriately selected and carried out, but particularly from the viewpoint of convenience, a corona discharge treatment is preferred. In the case of the corona discharge treatment, it is necessary to carry out the treatment so that the contact angle with water becomes 70° or less.

—Paper Substrate—

For the support according to the invention, a paper substrate which is an opaque support may be used.

The paper substrate may be any of a natural pulp paper containing typical natural pulp as a main component, a mixed paper formed from natural pulp and synthetic fiber, a synthetic fiber paper containing synthetic fiber as a main component, and a so-called synthetic paper produced by making a synthetic resin film of polystyrene, polyethylene terephthalate or polypropylene into pseudo-paper. Among them, a natural pulp paper (hereinafter, simply referred to as "base paper") is particularly preferable. The base paper may be used with a neutral paper (pH 5 to 9) or an acidic paper, but a neutral paper is more preferable.

The base paper may be made of a product prepared by using natural pulp selected from softwood, hardwood and the like as a main raw material, and adding, according to necessity, a loading material such as clay, talc, calcium carbonate or urea resin microparticles; a sizing agent such as rosin, an alkyl ketene dimer, a higher fatty acid, an epoxidated fatty acid amide, paraffin wax or alkenyl succinic acid; a paper strength augmenting agent such as starch, polyamide-polyamine-epichlorohydrin or polyacrylamide; a fixing agent such as aluminum sulfate or a cationic polymer; or the like. A softening agent such as a surfactant may also be added. Furthermore, a synthetic paper made using synthetic pulp instead of the natural pulp may also be used, and a paper made by mixing natural pulp and synthetic pulp at any ratio may also be used. Among them, it is preferable to use hardwood pulp which is composed of short fibers and increases smoothness. The freeness of the pulp material to be used is preferably in a range of 200 mL to 500 mL (C.S.F.), and more preferably in a range of 300 mL to 400 mL.

The paper substrate may contain other components such as a sizing agent, a softening agent, a paper strengthening agent and a fixing agent. The sizing agent may be rosin, paraffin wax, a higher fatty acid salt, an alkenyl succinic acid salt, a fatty acid anhydride, a styrene-maleic anhydride copolymer, an alkyl ketene dimer, an epoxidated fatty acid amide, or the like. The softening agent may be a reaction product of a maleic anhydride copolymer and a polyalkylene polyamine, a quaternary ammonium salt of a higher fatty acid, or the like. The paper strengthening agent may be polyacrylamide, starch, polyvinyl alcohol, a melamine-formaldehyde condensation product, gelatin or the like. The fixing agent may be aluminum sulfate, polyamide-polyamine-epichlorohydrin, or the like. In addition to these, a dye, a fluorescent dye, an antistatic agent and the like may be added according to necessity.

The paper substrate is preferably subjected to an activation treatment such as a corona discharge treatment, a flame treatment, a glow discharge treatment or a plasma treatment, in advance before the formation of the previously mentioned thermoplastic resin-containing layer.

—Calendering Treatment—

The support according to the invention may be subjected to a calendering treatment.

After providing a thermoplastic resin-containing layer on a paper substrate, a calendering treatment is applied under specific conditions. Thereby, planarity of the thermoplastic resin-containing layer may be obtained, and also, high glossiness and high planarity of the surface of the ink receiving layer formed with the thermoplastic resin-containing layer lying underneath, and high quality image formability may be secured.

The calendering treatment is preferably performed using a soft calender having at least one of a roll pair constituted of a metal roll (preferably constituted of a metal roll and a resin roll), or a supercalender, or using both, raising the surface temperature of the metal roll to a temperature at or above the glass transition temperature of the thermoplastic resin, and at the same time, setting the nip pressure between the roll nips in the roll pair at 50 kg/cm to 400 kg/cm.

Hereinafter, the soft calender having a metal roll and a resin roll, and the supercalender will be described in detail. The metal roll is a cylindrical or columnar roll having a flat surface, and may be appropriately selected from known metal rolls and used, without being limited on the material or the like, as long as the roll has a heating unit in the inside. Since the metal roll is contacted with the surface of the support on the recording surface side, that is, on the side where the ink receiving layer is formed, of the surfaces on the two sides of the support during the calendering treatment, the surface roughness is such that it is more preferable as the surface is smoother. Specifically, the surface roughness is preferably 0.3 s or less, and more suitably 0.2 s or less, in terms of the surface roughness defined by JIS B0601.

The surface temperature of the metal roll during the treatment is preferably 70° C. to 250° C., generally when a paper substrate is subjected to the treatment. In this regard, when a paper substrate provided with the previously mentioned thermoplastic resin-containing layer, is subjected to the treatment, the surface temperature is preferably a temperature at or above the glass transition temperature, Tg, of the thermoplastic resin contained in the thermoplastic resin-containing layer, and is more preferably the Tg or higher but Tg+40° C. or lower.

The resin roll may be appropriately selected from synthetic resin rolls formed from a polyurethane resin, a polyamide resin and the like, and a roll having a Shore D hardness of 60 to 90 is suitable.

The nip pressure of the roll pair having the metal roll is suitably 50 kg/cm to 400 kg/cm, and preferably 100 kg/cm to 300 kg/cm. In the case of performing the treatment using a soft calender arranged to have a single roll pair which is constituted as described above, and/or a supercalender, it is preferable to perform the treatment substantially once or twice.

The support that is used in the inkjet recording medium is not particularly limited, and a transparent support formed from a transparent material such as a plastic may also be used. As the material which may be used for the transparent support, a transparent material having a property to endure the radiation heat generated when used in an OHP or a backlight display is preferable. Examples of such a material include polyesters such as polyethylene terephthalate (PET); polysulfone, polyphenylene oxide, polyimide, polycarbonate, polyamide, and the like. Among them, polyesters are preferable, and in particular, polyethylene terephthalate is preferred.

Furthermore, an optical disk exclusive for read-only memory, such as CD-ROM or DVD-ROM, a writable type optical disk such as CD-R or DVD-R, or a rewritable optical disk may be used as a support, and an ink receiving layer and a glossiness imparting layer may be provided on the labeled surface side.

The constituent layers (for example, ink receiving layer) of the inkjet recording medium of the invention may be incorporated with a polymer microparticle dispersion. The polymer microparticle dispersion is used for the purpose of improving film physical properties, such as dimensional stability, curl preventing, adhesion preventing, and cracking preventing of the film. Descriptions on the polymer microparticle dispersion may be found in JP-A Nos. 62-245258, 62-1316648 and 62-110066. In addition, when a polymer microparticle dispersion having a low glass transition temperature (40° C. or lower) is added to the ink receiving layer, cracking in the layer or curling may be prevented. Also, when a polymer microparticle dispersion having high glass transition temperature is added to a back layer, curling may be prevented.

In inkjet recording, since the ink receiving layer needs to have an absorption capacity sufficient to absorb all of liquid droplets, the layer thickness of the ink receiving layer of the invention is to be determined in accordance with the porosity of the layer. For example, when the amount of ink is 8 $mL/mm^2$, and the porosity is 60%, a film having a thickness of about 15 μm or more is needed. When this point is taken into consideration, in the case of inkjet recording, the thickness of the ink receiving layer is preferably from 10 μm to 50 μm.

A pore size of the ink receiving layer is preferably 0.005 μm to 0.030 μm, and more preferably 0.01 μm to 0.025 μm, as a median size. The porosity and the pore median size may be measured using a mercury porosimeter (trade name: PORE-SIZER-9320-PC2, manufactured by Shimadzu Corp.).

It is preferable that the ink receiving layer has excellent transparency. As the reference, the haze value obtainable when the ink receiving layer is formed on a transparent film support, is preferably 30% or less, and more preferably 20% or less. The haze value may be measured using a haze meter (trade name: HGM-2DP, manufactured by Suga Test Instruments Co., Ltd.).

<Inkjet Recording Method>

The inkjet recording method of the invention is characterized in that recording is performed on the inkjet recording medium according to the invention, using the inkjet ink according to the invention and an image forming apparatus equipped with a specific ink circulating apparatus that will be described later. However, except for the constitution as such, there is no particular limitation on the recording method, and any known apparatuses and the like that are used for inkjet recording methods may be used.

According to the invention, as recording is performed using, in particular, the specific inkjet ink and the specific image forming apparatus described above, sharp and high-density recorded images may be obtained, with excellent ejection stability.

—Inkjet Recording System—

The inkjet recording method of the invention is characterized by using the inkjet ink and the inkjet recording medium according to the invention, and using an image forming apparatus equipped with an ink circulating apparatus that will be described later.

Other than the constitution as such, there is no particular limitation on the recording method, and any known inkjet recording system may be used.

The inkjet recording system includes known systems, for example, a charge control system of ejecting ink using electrostatic attractive force; a drop-on-demand system (pressure pulse system) of using the oscillating pressure of a piezoelectric element; an acoustic inkjet system of converting electric signals to an acoustic beam, propagating the acoustic beam to the ink, and ejecting the ink using the radiation pressure; a thermal inkjet system of forming air bubbles by heating the ink, and using the pressure generated therefrom; and the like. Among them, a drop-on-demand system (pressure pulse system) which utilizes the oscillating pressure of a piezoelectric element that alters the pressure difference between the liquids at a common flow channel and at a common circulation channel, which will be described later, is preferred. The details will be described later.

The inkjet recording system includes a system of injecting a large number of small volume droplets of a low-concentration ink called photo-ink, a system of improving the image quality using plural inks having substantially the same color but different concentrations, or a system of using a colorless and transparent ink.

In the inkjet recording method of the invention, drying may be carried out after printing images (preferably, within 10 minutes after printing). The inkjet recording apparatus is equipped with a drying apparatus in an in-line or off-line manner.

As for the drying method, a drying method by heating is preferable, and the heating method is carried out by a conventional method such as heating with warm air or hot air using a hot air blowing dryer, infrared drying using an infrared lamp, heating using a heated roll, or dielectric heating. In order to obtain recorded images which are excellent in density and suppressing color change from immediately after printing, without causing a problem of, for example, so-called curling due to excessive heating, it is preferable to perform a drying treatment within 2 minutes, and more preferably within 1 minute, from immediately after printing. It is preferable to perform drying at 50° C. to 200° C. for one second to 5 minutes, and more preferably at 50° C. to 150° C. for one second to 5 minutes.

(Image Forming Apparatus)

The image forming apparatus according to the invention is characterized by being equipped with an ink circulating apparatus, which has plural liquid droplet ejecting elements; a common flow channel which is connected with the plural liquid droplet ejecting elements through respective supply channels; and a common circulation channel which is connected with the plural liquid droplet ejecting elements through respective reflux channels, wherein the inkjet ink is supplied to the plural liquid droplet ejecting elements through the common flow channel, and the inkjet ink circulates to the common circulation channel.

Other than the constitution as described above, the image forming apparatus is not particularly limited, and may be configured to include other known apparatuses.

According to the invention, when the constitution of the inkjet recording method of the invention is adopted, since the inkjet ink being used is made to circulate, ejection failure may be prevented even in those nozzles that are waiting and are not in use, without the inkjet ink viscosity around the nozzles undergoing an increase. Particularly, by using the previously described inkjet ink, failure due to intermittent ejection may be significantly prevented.

[Configuration of Ink Circulation System]

The ink circulation system of an inkjet recording apparatus according to an exemplary embodiment of the image forming apparatus of the invention will be explained.

FIG. 1 is a diagram showing the outline of an ink circulation system of an inkjet recording apparatus.

As shown in FIG. 1, the ink circulation system of an inkjet recording apparatus 10 is mainly composed of a recording head 50 (50A), an ink tank 100, a sub-tank 102, a solvent concentration detector 104, a solvent adding unit 106, and a degassing unit 108. Ink is supplied from the ink tank 100 via the sub-tank 102 to the recording head 50, and ink droplets are ejected from each of plural nozzles 64 formed at the recording head 50, while a portion of the ink supplied to the recording head 50 circulates through the inside of the head and then is returned to the sub-tank 102.

Hereinafter, the configuration of each part will be described.

The flow channel 110 which connects the ink tank 100 and the sub-tank 102 is provided with a pump 112. The ink contained in the ink tank 100 is supplied to the sub-tank 102 by the pump 112. The pump 112 controls the amount of ink in the sub-tank 102 to be constant. The sub-tank 102 is equipped in the inside with a heater-cooler 114 for ink temperature adjustment, and the ink viscosity is lowered by regulating the temperature so that the temperature of the ink in the sub-tank 102 reaches a predetermined temperature by the heater-cooler 114 for ink temperature adjustment. For example, according to one embodiment, a temperature sensor (not shown in the diagram) which detects the ink temperature inside the recording head 50 is provided to control the heater-cooler 114 for ink temperature adjustment so that the ink temperature inside the recording head 50 reaches a predetermined temperature (for example, 55° C.) (that is, to obtain a desired ink viscosity).

The sub-tank 102 and the recording head 50 are connected through a first flow channel 116 and a second flow channel 118. The first flow channel 116 is connected through a first supply port 54 formed at one end of the common flow channel 52 formed at the recording head 50, and at the same time, the second flow channel 118 is connected through a second supply port 56 formed at the other end of the common flow channel 52. The first flow channel 116 is a supply flow channel for performing ink supply from the sub-tank 102 to the recording head 50, and is provided with a pump 120 and a filter 122. On the other hand, the second flow channel 118 is a circulating flow channel for returning a portion of the ink supplied to the recorded head 50, to the sub-tank 102, and is provided with a pump 124.

The ink contained in the sub-tank 102 is supplied from the first flow channel 116 to the recording head 50 via the filter 122, by the pump 120. The fineness (mesh size) of the filter 122 is preferably smaller than the nozzle diameter, and thereby any foreign matters incorporated in the inside of the recording head 50 from the sub-tank 102 may be prevented from causing nozzle clogging. For example, a filter having a mesh size that is about 10% smaller than the nozzle diameter may be used.

A portion of the ink supplied to the recording head 50 is returned through the second flow channel 118 to the sub-tank 102 via the common flow channel 52 by means of the pump 124. Although not shown in the diagram, according to one embodiment, the second flow channel 118 is provided with a vacuum degassing unit in the upstream (on the side of the recording head 50) of the pump 124.

Pressure chambers 58, which are connected with the common flow channel 52, are each provided with a nozzle flow channel 62, which is a channel that is connected with a nozzle 64. A reflux channel 72 is provided at the nozzle flow channel 62, which is connected with a common circulation channel 70 via the reflux channel 72. The common circulation channel 70 is connected with a withdrawal port 74 through a connection flow channel that is not shown in the diagram (indicated with symbol 71 in FIG. 3), and the withdrawal port 74 is connected with a flow channel 130, which is linked to a pump 132.

Figure 2:
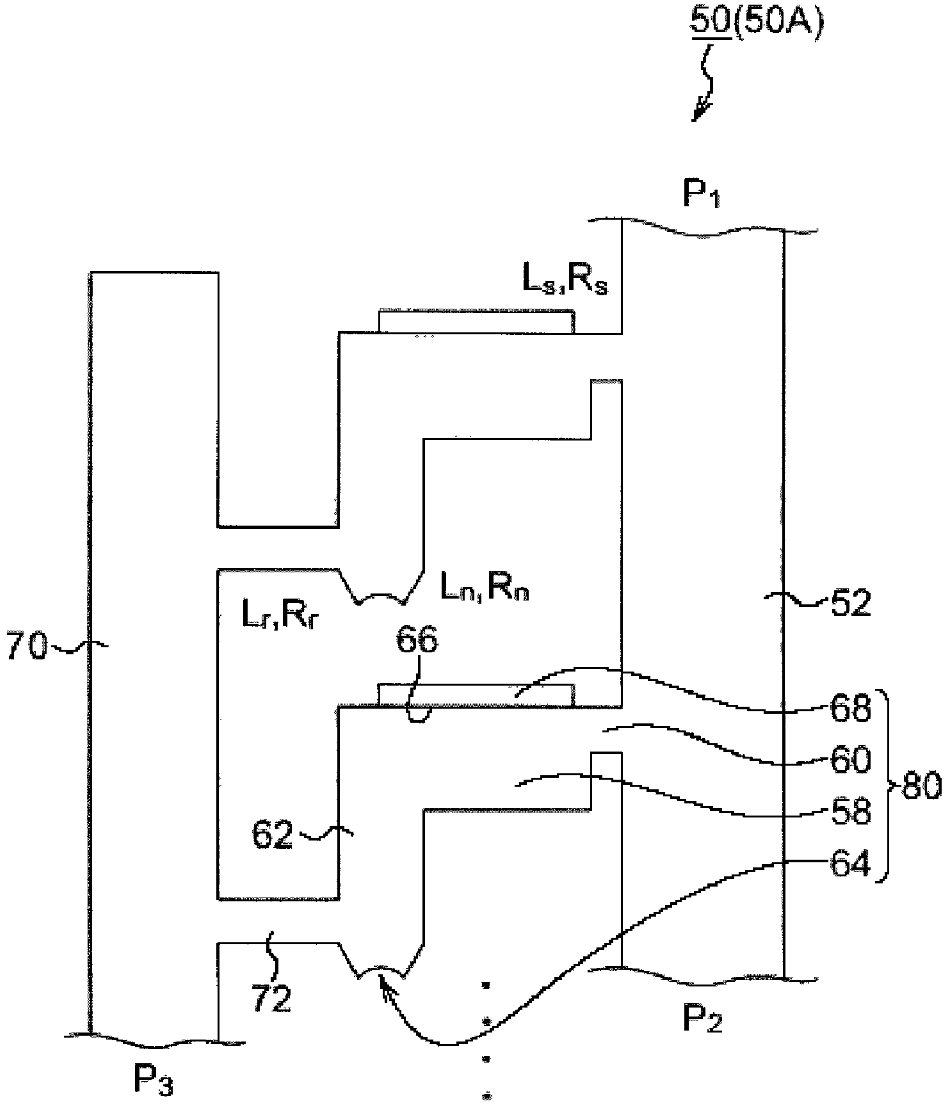
FIG. 2 is a schematic diagram showing an example of the internal structure of a recording head 50.

FIG. 2 is a schematic diagram showing an example of the internal structure of the recording head 50. As shown in FIG. 2, the recording head 50 is provided with plural liquid droplet ejecting elements 80, each of which is composed of a nozzle 64 serving as an ejection port for ink droplets, a pressure chamber 58, a supply channel 60, and a piezoelectric element 68 which deforms a vibrating plate 66 that constitutes a wall of the pressure chamber 58. The details on the configuration of the recording head 50 will be described later, but the recording head 50 is constituted of plural head units arranged in a row. In each of the head units, a number of liquid droplet ejecting elements 80 are arranged in a matrix form (two-dimensionally).

Each of the pressure chambers 58 is connected with the common flow channel 52 through the supply channel 60, and ink supply is performed through the common flow channel 52 to each of the pressure chambers 58 via a corresponding supply channel 60. The supply channel 60 also functions as a supply restrictor that suppresses backflow from the pressure chamber 58 to the common flow channel 52. Each of the pressure chambers 58 also is connected with the nozzle 64 through the nozzle flow channel 62.

The vibrating plate 66, which constitutes a wall in each pressure chamber 58, is provided with a piezoelectric element 68. Upon applying a driving voltage to the piezoelectric element 68, the deformation of the vibrating plate 66 causes a change in the volume of the pressure chamber 58. If the vibrating plate 66 is deformed in a direction causing an increase in the volume of the pressure chamber 58, the meniscus formed at the nozzle 64 is drawn in toward the side of ink inflow (toward the pressure chamber 58), and at the same time, the ink inside the common flow channel 52 is sucked into the pressure chamber 58 through the supply channel 60 to refill the pressure chamber. On the other hand, if the vibrating plate 66 is deformed in a direction causing a decrease in the volume of the pressure chamber 58, the meniscus at the nozzle 64 is pushed out toward the side of ink ejection (toward the opposite side of the pressure chamber 58), so that ink droplets are ejected from the nozzle 64. Particularly, it is preferable that the interval of the pull and push is adjusted to one-fourth of the fluidic resonance period of the pressure chamber 58 and the ink. A large displacement is obtained as the oscillation of the pull and push is built up, and thereby ink ejection may be easily carried out.

Upon performing ink ejection, the ink in the pressure chamber 58 flows not only to the nozzle flow channel 62, which is on the side of ink ejection, but also partly to the supply channel 60, which is on the side of ink supply. The amount of ink flowing from the pressure chamber 58 to the nozzle flow channel 62, and the amount of ink flowing from the pressure chamber 58 to the supply channel 60 are determined by a ratio of the respective flow channel resistances and inertance. In a general inkjet head, the dimensions of various units are determined to be at the ratio of approximately 1:1.

Figure 3:
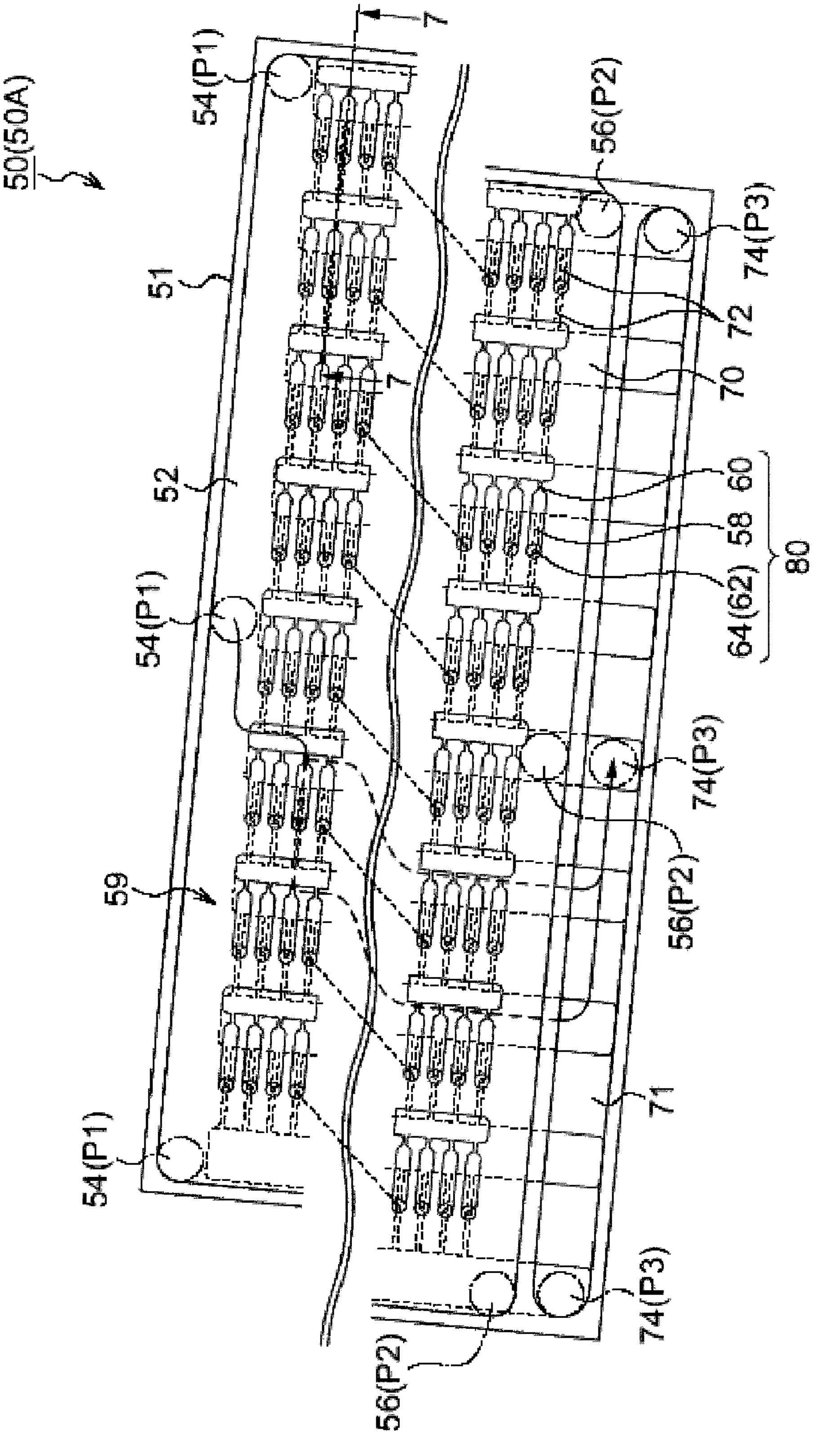
FIG. 3 is a plane view showing the detailed structure of the recording head 50.
Figure 4:
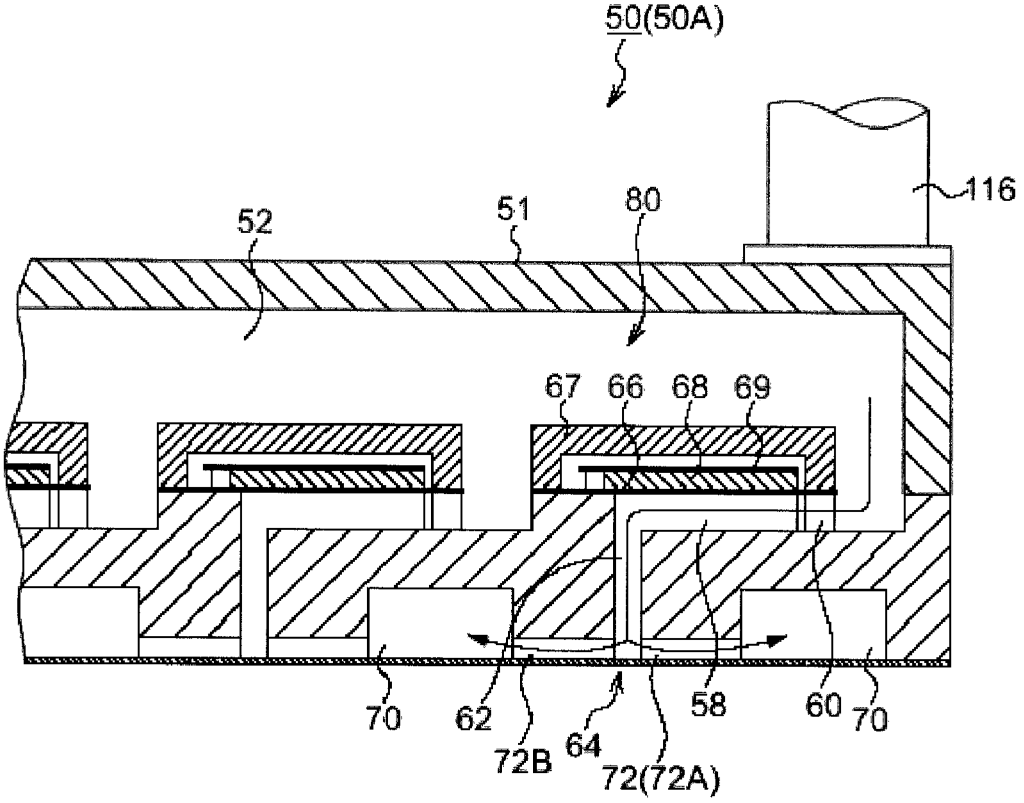
FIG. 4 is a cross-sectional view (cross-sectional view along the line 7-7 in FIG. 3) showing a part of the recording head 50.

FIG. 3 is a plane view showing the detailed structure of the recording head 50. FIG. 4 is a cross-sectional view showing a part of the recording head 50 (a cross-sectional view along the line 7-7 in FIG. 3). In FIG. 3, the vibrating plate 66 and the piezoelectric element 68 are not shown for easier understanding of the configuration of the pressure chamber 58. The recording head 50 according to the exemplary embodiment is composed of plural head units 51 arranged in a row, and such a head unit is shown in FIG. 3 and FIG. 4. Definitely, a head may also be constituted of a single head unit 51.

As shown in FIG. 3, the head unit 51 has liquid droplet ejecting elements 80, each including the nozzle 64 and the pressure chamber 58, disposed in a matrix form (two-dimensionally). The common flow channel 52 is formed across the entire region where the pressure chambers 58 are formed, and three first supply ports 54 and three second supply ports 56 are provided such that the ports are opened to the common flow channel 52.

The head unit 51 is also provided with plural common circulation channels 70 for each row of pressure chambers 59. Each common circulation channel 70 is connected with each of the pressure chambers 58 in the corresponding row of pressure chambers 59. More specifically, as shown in FIG. 2, each pressure chamber 58 are connected with the common circulation channel 70 through the corresponding nozzle flow channel 62 and reflux channel 72. The plural common circulation channels 70 are joined into one channel through a communicating flow channel 71, and the communicating flow channel 71 has three withdrawal ports 74 formed therein.

As shown in FIG. 4, the vibrating plate 66 that constitutes a wall of the pressure chamber 58 is provided thereon with a piezoelectric element 68 equipped with an individual electrode 69. As for the vibrating plate 66, an electric conductive substrate having at least an electrode layer (electric conductive layer) formed at the surface is used, so that the vibrating plate 66 also serves as a common electrode for the piezoelectric element 68. For the piezoelectric element 68, a piezoelectric substance such as lead titanate zirconate (Piezo) is suitably used.

A protective cover 67 is provided such as to cover the piezoelectric element 68 on the vibrating plate 66, so that an attempt is made to provide insulating protection of the piezoelectric element 68 or other wiring members (not shown in the diagram) from the ink in the common flow channel 52.

In regard to the recording head 50 constituted as such, as shown in FIG. 3, when the pressure of ink at the first supply port 54 formed in the upstream of the common flow channel 52 is designated as P1, the pressure of ink at the second supply port 56 formed in the downstream of the common flow channel 52 is designated as P2, and the pressure of ink at the withdrawal port 74 formed at one end of the common circulation channel 70 (more specifically, the communicating flow channel 71) is designated as P3, if the respective pressures P1, P2 and P3 are set or controlled such that the relationship of the following expression: $P1>P2>P3$ is established. By setting and controlling as such, a flow of ink directed from the upstream side of the common flow channel 52 to the downstream side is formed, and at the same time, a flow of ink directed from the common flow channel 52 to the common circulation channel 70 via the supply channel 60, the pressure chamber 58, the nozzle flow channel 62, and the reflux channel 72 is formed. Here, in general, since the channel cross-sectional area of the common flow channel 52 is larger and the fluid resistance is smaller, the pressure difference, $\Delta P$, between the first supply port 54 and the second supply port 56 is about several hundred to several thousand kPa.

The amount of flow per unit time of the ink flowing inside the common flow channel 52 may be determined from the pressure difference of ink (P1-P2) between the first supply port 54 and the second supply port 56 and the fluid resistance at the common flow channel 52. The amount of flow at the common flow channel 52 is preferably set to be an amount capable of controlling the temperature changes caused by the heat generation in the recording head 50, as well as an amount capable of making air bubbles to flow when air bubbles have entered into the common flow channel 52. Both of these conditions may be satisfied when a large amount of flow is used. Although it is needed to set the amount of flow in the scope of not generating turbulence within the common flow channel 52, it is thought that general amounts of heat generation and dimensions of inkjet head do not initially bring about an uncontrollable state.

For example, a practical flow rate is about 10 times to 20 times the amount of ink consumption per unit time period when the head is in the state of full ejection (ejection in the case of continued ejection for image drawing at the maximum frequency and the maximum ejection volume). If a head which ejects ink at an amount of 2 [pL] at 40 [kHz] has a nozzle density of 1200 [dpi] and a length of 2 inches per unit, the amount of ink consumption is 2×2×1200×40000 [pL/sec] =0.192 [mL/sec], and thus the amount of ink flowing through the common flow channel 52 is adjusted to about 2 [mL/sec] to 4 [mL/sec].

Furthermore, the pressures P1 and P2 exerted respectively to the supply ports 54 and 56 by the pumps 120 and 124, are weak negative pressures, so that the meniscus formed at the openings of the nozzles 64 in the recording head 50 is pulled in slightly. Thus, the pressures are −20 [$mmH_2O$] to −60 [$mmH_2O$] relative to the atmospheric pressure.

Generally, in an inkjet head, the ink at the nozzle portion is subjected to a slightly negative pressure relative to the atmospheric pressure, so that ink does not leak from non-ejecting nozzles. If the negative pressure is excessive, the surface tension of the meniscus is overcome by the pressure, and air is sucked in through the nozzle. For example, when an ink having a surface tension of 35 [mN/m] is used with a nozzle having a diameter of 18 [μm], the maximum value of the surface tension is $1.98\times10^{-6}$ [N], and the surface tension per unit area of nozzle is 8 [$kN/m^2$]. When this is converted, the value is 81 [$gf/cm^2$], and thus the negative pressure is brought to equilibrium with the meniscus at −810 [$mmH_2O$]. If the negative pressure exceeds this value, the meniscus is destroyed. However, since an actual head has a large number of nozzles, the working precision and surface roughness at the nozzle portion, or defects in the water repellence treatment at the nozzle portion, vibration and the like may cause, in many cases, a back pressure lower than this calculated value, and subsequent destruction of the meniscus. In fact, in experiments, stabilized results are not always obtained because of the instability factors as mentioned previously, but in many instances, the meniscus is destroyed at −100 [$mmH_2O$] to −400 [$mmH_2O$]. Thus, the upper limit of the back pressure is defined as −60 [$mmH_2O$] based on experimental results, with some margin taken into consideration. On the other hand, the lower limit is defined as −20 [$mmH_2O$], so that the ink does not leak even though a back pressure is exerted by environmental changes such as air pressure and temperature, or by vibration. All these values are not theoretically determined values, but are a range of values that are based on experimentation and are capable of obtaining stabilized performance.

Returning to FIG. 1, the withdrawal port 74 of the recording head 50 is connected with a flow channel 130. The flow channel 130 is provided with a pump 132, and the channel end opposite to the withdrawal port 74 is connected to a reservoir tank 134. The ink which has come after circulating through the common flow channel 52, supply channel 60, pressure chamber 58, nozzle flow channel 62, reflux channel 72 and common circulation channel 70 is withdrawn to the reservoir tank 134 after passing through the withdrawal port 74 and the flow channel 130 under the operation of the pump 132.

The flow channel 136 which connects the reservoir tank 134 and the sub-tank 102 is provided with a solvent concentration detector 104, a solvent adding unit 106, a degassing unit 108, a pump 138, and a filter 140, in this sequence from the upstream side (the side of reservoir tank 134) toward the downstream side (the side of sub-tank 102).

When the ink withdrawn into the reservoir tank 134 is returned to the sub-tank 102 via the flow channel 136, first, detection of the solvent concentration is carried out using the solvent concentration detector 104, based on the density, viscosity, flow rate change, electric conductivity or the like of the ink. Subsequently, the solvent in the solvent tank 144 is added to the ink in the flow channel 136 by the solvent adding unit 106, in accordance with the detection results obtained by the solvent concentration detector 104. Thereby, the circulated ink which has passed through the pressure chamber 58 or the nozzle flow channel 62, particularly the ink which has been thickened near the nozzles, may be restored to have an appropriate viscosity. As will be described later, the solvent concentration detected by the solvent concentration detector 104 is sent to the solvent concentration control unit (not shown), and the solvent adding unit 106 is driven under the action of the solvent concentration control unit.

Furthermore, the degassing unit 108 connected to a vacuum pump 146 performs a treatment of reducing the amount of air dissolved in the ink (degassing treatment). Here, when a vacuum degassing unit is provided on the upstream side (the side of recording head 50) of the pump 124 of the second flow channel 118, which connects the sub-tank 102 and the recording head 50, the degassing unit 108 is omitted.

The ink, which has been subjected to the degassing treatment by the degassing unit 108, is returned to the sub-tank 102 by the pump 138 via the filter 140. Then, the ink is supplied again to the recording head 50, together with the ink supplied from the ink tank 100.

According to the configuration of the ink circulation system shown in FIG. 1, since the reservoir tank 134 is disposed between the pump 132 and the solvent adding unit 106 or the degassing unit 108, it may be arranged such that the pressure P3 exerted at the withdrawal port 74 by the pump 132 is not affected by the regeneration treatment such as solvent addition or degassing.

(Operation)

The operation of the ink circulation system of an inkjet recording apparatus which is an exemplary embodiment of the image forming apparatus according to the invention will be explained by referring to FIG. 5.

Figure 5:
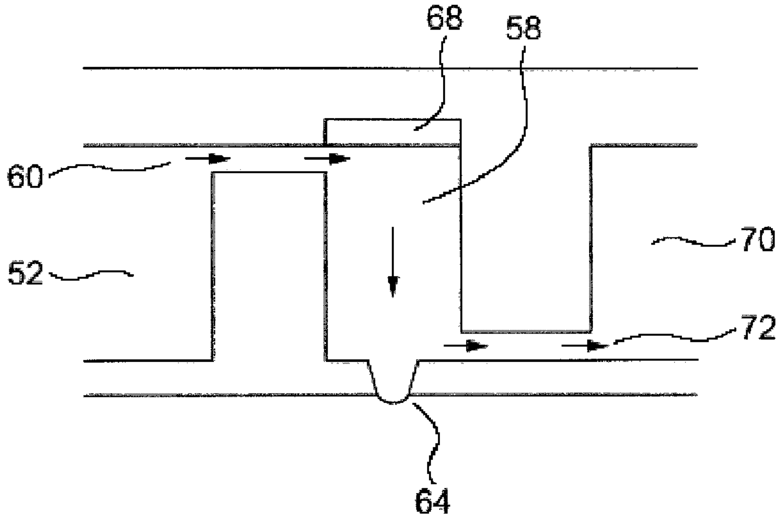
FIG. 5 is an explanatory diagram for ink flow, explaining the flow of ink that flows from a common flow channel 52 to a common circulation channel 70 via a supply channel 60.

FIG. 5 is an explanatory diagram for ink flow, which explains the flow of ink flowing from the common flow channel 52 to the common circulation channel 70 via the supply channel 60.

In FIG. 5, the ink supplied from the ink tank (not shown in the diagram) flows first to the common flow channel (supply side) 52. Subsequently, the ink is supplied from the common flow channel (supply side) 52 to individual pressure chambers 58 via the supply channel 60. This supply channel 60 is designed such that the inertance is increased, thus preventing the backflow of the ink to the common flow channel (supply side) 52 at the time of ejection. The ink introduced into the pressure chamber 58 is ejected through the nozzle according to the driving of a pressure element (actuator) 68. Also, separately from the action of the pressure element (actuator) 68, the ink is made to flow from the pressure chamber 58 to the common circulation channel (circulation side) 70 via the circulation channel 72 as a result of the pressure difference between the common flow channel (supply side) 52 and the common circulation channel (circulation side) 70. This circulation channel is designed such that the inertance is increased in order to prevent the ink from flowing to the common circulation channel (circulation side) 70 at the time of ejection. The ink that has flowed to the common circulation channel (circulation side) 70 is returned to the ink tank.

The flow of the ink is as described in the following Table 1.

The flow in the circulation is induced by the pressure difference between the liquid at the common flow channel (supply side) and the liquid at the common circulation channel (circulation side). The flow in the ejection is induced by the pressure generated by the pressure element (actuator). This rapid flow hardly occurs at the supply channel and the circulation channel where the inertance is high.

dimer (trade name: SIZEPINE K, manufactured by Arakawa Chemical Industries, Ltd.), 0.29% of epoxidated behenic acid amide, and 0.32% of polyamide-polyamine-epichlorohydrin (trade name: ARAFIX 100, manufactured by Arakawa Chemical Industries, Ltd.), based on the pulp, and thereafter 0.12% of an antifoaming agent was added thereto.

The pulp slurry prepared as described above was made into paper using a Fourdrinier paper machine. In a process of drying the paper by pressing the felt surface of the web in a drum dryer cylinder, with a dryer canvas interposed between the felt surface and the dryer cylinder, drying was performed with the tensile strength of the dryer canvas set at 1.6 kg/cm, and then polyvinyl alcohol (trade name: KL-118, manufactured by Kuraray Co., Ltd.) was coated by size pressing in an amount of 1 $g/m^2$ on both sides of a base paper. The coated base paper was dried and was subjected to a calendering treatment. The base paper was made to have a basis weight of 166 $g/m^2$, and thus a base paper (substrate paper) having a thickness of 160 μm was obtained.

TABLE 1

| [Flow in connection with circulation] | | |
|---|---|---|
| Common flow channel (supply side)→Supply channel → | Pressure chamber →Circulation channel<br>×<br>Nozzle | →Common circulation channel (circulation side) |
| [Flow in connection with ejection] | | |
| Common flow channel (supply side) × Supply channel ← | Pressure chamber→Circulation channel<br>↓<br>Nozzle | × Common circulation channel (circulation side) |

As discussed above, by constantly circulating the ink, physical property changes caused by drying of the ink are suppressed. The inkjet recording method of the invention having such an ink circulation system may be carried out as an image forming method excellent in the intermittent ejectability of ink.

All publications, patent applications, and technical standards mentioned in this specification are herein incorporated by reference to the same extent as if each individual publication, patent application, or technical standard was specifically and individually indicated to be incorporated by reference.

EXAMPLES

Hereinafter, the present invention will be more specifically described by way of Examples. The scope of the invention is not intended to be limited to the specific examples shown below. In particular, unless stated otherwise, the terms "part" and "%" are based on weight.

Example 1

Preparation of Support 50 parts of LBKP obtained from acacia and 50 parts of LBKP obtained from aspen were respectively processed by beating using a disc refiner to obtain a Canadian freeness of 300 mL, and thus a pulp slurry was prepared.

Subsequently, to the pulp slurry obtained as described above were added 1.3% of cation-modified starch (trade name: CAT 0304L, manufactured by Nippon NSC, Ltd.), 0.15% of anionic polyacrylamide (trade name: DA4104, manufactured by Seiko PMC Corp.), 0.29% of an alkyl ketene After performing a corona discharge treatment on the wire surface (back surface) of the obtained substrate paper, high density polyethylene was coated thereon in an amount of 25 $g/m^2$ using a melt extruder, and thus a thermoplastic resin layer having a matt surface was formed. The thermoplastic resin layer of this back surface side was further subjected to a corona discharge treatment, and then a dispersion prepared as an antistatic agent by dispersing aluminum oxide (trade name: "ALUMINASIL 100", manufactured by Nissan Chemical Industries, Ltd.) and silicon dioxide (trade name: "SNOWTEX O", manufactured by Nissan Chemical Industries, Ltd.) at a ratio of 1:2 by weight in water, was coated to obtain a dry weight of 0.2 $g/m^2$. Subsequently, the surface was treated with corona discharge, and then a polyethylene having a density of 0.93 $g/cm^3$ and containing 10% of titanium oxide was coated on the surface using a melt extruder in an amount of 24 $g/m^2$.

(Preparation of Coating Liquid A for Ink Receiving Layer (First Liquid))

(1) Gas-phase process silica microparticles, (2) ion-exchanged water, (3) "SHALLOL DC-902P", and (4) "ZA-30", as shown in the following composition, were mixed, and the mixture was dispersed using a bead mill (trade name: KD-P, manufactured by Shinmaru Enterprises Corp.). The dispersion was then heated to 45° C., and was maintained for 20 hours. Subsequently, (5) an aqueous solution of boric acid, (6) a dimethylamine-epichlorohydrin-polyalkylene polyamine condensation product, (7) a polyvinyl alcohol solution, (8) "SUPERFLEX 650-5", and (9) ethanol water were added as shown below to the dispersion at 30° C., and thus a coating liquid A for ink receiving layer (first liquid) was prepared.

| | |
|---|---|
| (1) Gas-phase process silica microparticles (trade name: AEROSIL 300SF75, manufactured by Nippon Aerosil Co., Ltd.) | 100 parts |
| (2) Ion-exchanged water | 555 parts |
| (3) "SHALLOL DC-902P" (dispersant, manufactured by Daiichi Kogyo Seiyaku Co., Ltd., 51.5% aqueous solution) | 8.7 parts |
| (4) Zirconyl acetate (trade name: "ZA-30", manufactured by Daiichi Kigenso Kagaku Kogyo Co., Ltd., 50% aqueous solution) | 2.7 parts |
| (5) Boric acid (crosslinking agent) (7.5% aqueous solution) | 50 parts |
| (6) Dimethylamine-epichlorohydrin-polyalkylene polyamine polycondensate (trade name: "SC-505", Hymo Co., Ltd., 50% aqueous solution) | 0.77 parts |
| (7) Polyvinyl alcohol (water-soluble resin) solution having the following composition | 290 parts |
| (8) "SUPERFLEX 650-5" (cation-modified polyurethane, manufactured by Daiichi Kogyo Seiyaku Co., Ltd., 25% solution) | 25 parts |
| (9) Ethanol water (ethanol content 59%) | 75 parts |

- Composition of polyvinyl alcohol solution -

| | |
|---|---|
| Polyvinyl alcohol (trade name: "PVA235", manufactured by Kuraray Co., Ltd., degree of saponification 88%, degree of polymerization 3500) | 20.3 parts |
| Diethylene glycol monobutyl ether (trade name: "BUTYCENOL 20P", manufactured by Kyowa Hakko Chemicals Co., Ltd.) | 6.0 parts |
| Ion-exchanged water | 263.7 parts |

(Preparation of basic solution B (second liquid))

A composition shown below was mixed under stirring, and thus a basic solution B was obtained.

| | |
|---|---|
| (1) Boric acid | 0.65 parts |
| (2) Zirconyl ammonium carbonate (trade name: ZIRCOSOL AC-7 (13% aqueous solution), manufactured by Daiichi Kigenso Kagaku Kogyo Co., Ltd.) | 2.5 parts |
| (3) Ammonium carbonate (first grade, manufactured by Kanto Chemical Co., Inc.) | 4.0 parts |
| (4) Ion-exchanged water | 92.85 parts |
| (5) EMULGEN 109P (polyoxyethylene lauryl ether, manufactured by Kao Corp.) | 0.6 parts |

(Preparation of aqueous solution of polyvalent metal salt C for in-line blend)

A composition shown below was mixed under stirring, and thus an aqueous solution of polyvalent metal salt C for in-line blend was obtained.

| | |
|---|---|
| (1) ALFINE 83 (polyaluminum chloride, manufactured by Taimei Chemicals Co., Ltd., 70% solution) | 20.0 parts |
| (2) EMULGEN 109P (polyoxyethylene lauryl ether, manufactured by Kao Corp.) | 4.4 parts |
| (3) Ion-exchanged water | 75.6 parts |

(Preparation of Inkjet Recording Medium)

After performing a corona discharge treatment on the front surface of the support, a coating liquid A-2 for ink receiving layer was prepared by in-line mixing a flow of the coating liquid A for ink receiving layer (first liquid), which was flowed in an amount of coating of 173 g/m$^2$, with the aqueous solution of polyvalent metal salt C for in-line blend, at a rate of 10.8 g/m$^2$, and coating was carried out. Thereafter, the coating layer was dried using a hot air dryer at 80° C. (air speed 3 msec to 8 msec) until the solids content reached 20%. The coating layer exhibited constant rate drying pattern during the period. Thereafter, before the coating layer exhibited falling rate drying pattern, the coating layer was immersed in the basic solution B (second liquid) for 3 seconds to adhere the basic solution on the coating layer in an amount of 13 g/m$^2$, and the coating layer was dried at 80° C. for 10 minutes (curing process). Thereby, an inkjet recording medium provided with an ink receiving layer having a dry film thickness of 32 μm was produced.

[Measurement of Swelling Ratio of Water-Soluble Resin]

(Preparation of Water-Soluble Resin Layer)

The surface of the support obtained as described above was subjected to a corona discharge treatment, and then a coating liquid for water-soluble resin layer shown below was applied on the surface using an extrusion die coater such that the film thickness after drying would be 5 μm. The coating layer was dried at 80° C. for 10 minutes, and thus a water-soluble resin layer was obtained.

| (Coating liquid for water-soluble resin layer) | |
|---|---|
| Ion-exchanged water | 56.4 parts |
| Polyvinyl alcohol solution (7% aqueous solution) (trade name: PVA235, manufactured by Kuraray Co., Ltd., degree of saponification 88%, degree of polymerization 3500) | 37.2 parts |
| Boric acid (7.5% aqueous solution) | 6.4 parts |
| EMULGEN 109P (10% aqueous solution) (Polyoxyethylene lauryl ether, manufactured by Kao Corp.) | 0.7 parts |

(Measurement of Swelling Ratio)

The water-soluble resin layer was conditioned for two days under an environment of 23° C. and 50% RH, and then the swelling ratio of the water-soluble resin layer was measured under the same environment, 5 minutes after adding dropwise 1 mL of the water-soluble organic solvent described in Table 2, based on the changes in the film thickness. When the water-soluble resin was PVA235, and the water-soluble organic solvent was diethylene glycol monomethyl ether, the swelling ratio of the resin was 0.9% (other combinations of the water-soluble resin/water-soluble organic solvent were also measured by substantially the same method).

<Preparation of Ink>

(Preparation of Magenta Ink)

Deionized water was added to the following components to obtain a final volume of 1 liter, and then the mixture was stirred for one hour while the mixture was heated at 30° C. to 40° C. Subsequently, the mixture was adjusted to pH 9 using 10 mol/L of KOH, and the mixture was filtered under reduced pressure through a microfilter having an average pore size of 0.25 μm, to thus prepare a magenta ink liquid (M-101).

| | |
|---|---|
| Dye M-1 described below | 35.0 g/L |
| Triethylene glycol (swelling ratio for PVA235:5.0%) | 19.0 g/L |
| Diethylene glycol monomethyl ether (DEGmME) (swelling ratio for PVA235:0.9%) | 100.0 g/L |
| 2-Pyrrolidone (swelling ratio for PVA235:4.5%) | 11.0 g/L |
| Urea | 24.0 g/L |
| PROXEL XL2 (manufactured by Avecia Biologics, Ltd.) | 1.1 g/L |
| Betaine compound described below | 17.0 g/L |
| NEWPOL PE-108 (PEG(300)-PPG(55) copolymer, manufactured by Sanyo Chemical Industries, Ltd.) | 8.0 g/L |

-continued

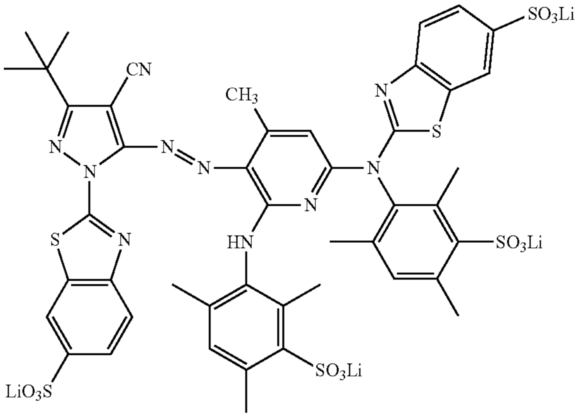

M-1

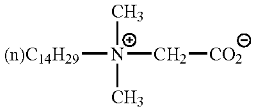

Betaine compound

<Performance Evaluation>

[Ejectability]

Ejection stability of the inkjet ink prepared as described above was evaluated as follows. The evaluation environment was at a temperature of 25° C. and a relative humidity of 50%.

As an apparatus for evaluation, inkjet recording apparatus A described below was used, and evaluation was performed for the following evaluation items (i) to (iii). The results were evaluated according to the following evaluation criteria. Image irregularities were observed by visual inspection using an optical microscope. Ejection ratio was calculated by "(number of nozzles recognized of ejection/total number of nozzles)×100(%)". The results are shown in Table 2.

(Inkjet Recording Apparatus A)

As for the inkjet recording apparatus A, an inkjet recording apparatus as described in FIG. 1, set up under the following setting conditions, was used. However, the apparatus did not make use of the solvent concentration detector 104, the solvent adding unit 106 and the filter 140.

<Setting Conditions>

Ink temperature inside sub-tank 102: 25° C.

Filter 122: mesh size 5 μm

Head unit 51: nozzle diameter 18 μm, 1200 dpi, having a length of 2 cm per unit Piezoelectric element 68: lead titanate zirconate (Piezo)

Amount of ink flowing through common flow channel 52: 2 mL/sec to 4 mL/sec

—Evaluation Item—

(i) The state in which image irregularities are not visible is designated as good.

(ii) The state, in which the ejection ratio obtained at the time of re-ejection after continuous ejection for one minute and subsequent resting for 60 minutes and forming the image again, is 90% or more (non-ejection ratio being less than 10%), is designated as good.

(iii) The state, in which the ejection ratio after continuous ejection for 60 minutes was 95% or more (non-ejection ratio being less than 5%), is designated as good.

The failure due to a gap in the point of impact is included in the non-ejection ratio.

—Evaluation Criteria—

AA: All of (i) to (iii) are satisfied.

A: Two items, (i) and (ii), are satisfied.

B: Two items, (i) and (iii), are satisfied.

C: Only (i) is satisfied.

D: All of (i) to (iii) are not satisfied.

[Print Density]

Using inkjet recording apparatus A, a magenta solid image was printed, using the magenta ink obtained as described above, on the side having the ink receiving layer of the inkjet recording medium obtained as described above, under an environment of 25° C. and 50% RH and under the setting of no color correction. The printed image was stored in the same environment for 24 hours. After the storage, density measurement was carried out with X-RITE 310 (trade name, manufactured by X-Rite, Inc.), and the image was evaluated according to the following evaluation criteria. The obtained results are shown in Table 2.

A: Having a density of 2.3 or more

B: Having a density of 2.2 or more but less than 2.3

C: Having a density of 2.1 or more but less than 2.2

D: Having a density of less than 2.1

Examples 2 to 18 and Comparative Examples 1 to 3

Magenta inks were prepared in a manner substantially similar to the process in the preparation of the magenta ink (M-101) of Example 1, except that the water-soluble organic solvent, the type and amount of the water-soluble polymer thickening agent, and the like used in Example 1 were changed as indicated in the following table. Image printing was performed in a manner substantially similar to that in Example 1, and the printed images were evaluated in a manner substantially similar to that in Example 1. The obtained results are shown in the following table.

The swelling ratio of TEGmME for the water-soluble resin was 3.4%. In the Examples and Comparative Examples, DPGmBE represents dipropylene glycol monobutyl ether, PGmME represents propylene glycol monomethyl ether, and TEGmME represents triethylene glycol monomethly ether.

TABLE 2

| | Total content of solvents (a + b) | General solvent (b) | | Specific water-soluble organic solvent (a) | | | | Water-soluble polymer thickening agent | | | Evaluation | | Presence of ink circulating apparatus |
|---|---|---|---|---|---|---|---|---|---|---|---|---|---|
| | | Name of solvent | Content (relative to ink) | Name of solvent | Content (relative to ink) | Swelling ratio (for water-soluble resin) | Content ratio (a)/(a + b) | Name of product | Average molecular weight | Addition amount (relative to ink) | Density | Ejectability | |
| Example 1 | 13.0% | TEG/2-Py | 3.0% | DEGmME | 10% | 0.9% | 77% | NEWPOL PE-108 | 16000 | 0.8% | A | AA | yes |

TABLE 2-continued

| | Total content of solvents (a + b) | General solvent (b) Name of solvent | General solvent (b) Content (relative to ink) | Specific water-soluble organic solvent (a) Name of solvent | Specific water-soluble organic solvent (a) Content (relative to ink) | Specific water-soluble organic solvent (a) Swelling ratio (for water-soluble resin) | Content ratio (a)/(a + b) | Water-soluble polymer thickening agent Name of product | Water-soluble polymer thickening agent Average molecular weight | Water-soluble polymer thickening agent Addition amount (relative to ink) | Evaluation Density | Evaluation Ejectability | Presence of ink circulating apparatus |
|---|---|---|---|---|---|---|---|---|---|---|---|---|---|
| Example 2 | 13.0% | TEG/2-Py | 3.0% | DEGmME | 10% | 0.9% | 77% | no addition | — | 0.0% | A | B | yes |
| Example 3 | 13.0% | TEG/2-Py | 3.0% | DEGmME | 10% | 0.9% | 77% | NEWPOL HB-400 | 1340 | 4.0% | A | B | yes |
| Example 4 | 13.0% | TEG/2-Py | 3.0% | DEGmME | 10% | 0.9% | 77% | NEWPOL PE-78 | 9000 | 1.5% | A | AA | yes |
| Example 5 | 13.0% | TEG/2-Py | 3.0% | DEGmME | 10% | 0.9% | 77% | NEWPOL PE-68 | 9000 | 1.5% | A | AA | yes |
| Example 6 | 13.0% | TEG/2-Py | 3.0% | DEGmME | 10% | 0.9% | 77% | NEWPOL PE-62 | 2200 | 2.0% | A | AA | yes |
| Example 7 | 13.0% | TEG/2-Py | 3.0% | DEGmME | 10% | 0.9% | 77% | JurimerAC-10P | 5000 | 0.4% | A | A | yes |
| Example 8 | 13.0% | TEG/2-Py | 3.0% | DEGmME | 10% | 0.9% | 77% | JurimerAC-10LP | 25000 | 0.2% | A | A | yes |
| Example 9 | 13.0% | TEG/2-Py | 3.0% | DEGmME | 10% | 0.9% | 77% | AQUALIC DL | *1 | 0.3% | A | A | yes |
| Example 10 | 13.0% | TEG/2-Py | 3.0% | DEGmME | 10% | 0.9% | 77% | PVA205 | 23000 | 0.3% | A | A | yes |
| Example 11 | 13.0% | TEG/2-Py | 3.0% | DEGmME | 10% | 0.9% | 77% | PVP25K | 35000 | 0.5% | A | A | yes |
| Example 12 | 13.0% | TEG/2-Py | 3.0% | DEGmME | 10% | 0.9% | 77% | PEG20000 | 20000 | 0.3% | A | A | yes |
| Example 13 | 13.0% | TEG/2-Py | 3.0% | DPGmBE | 10% | 0.9% | 77% | NEWPOL PE-108 | 16000 | 0.8% | A | AA | yes |
| Example 14 | 13.0% | TEG/2-Py | 3.0% | 1,2-Hexanediol | 10% | 2.0% | 77% | NEWPOL PE-108 | 16000 | 0.8% | B | A | yes |
| Example 15 | 13.0% | TEG/2-Py | 3.0% | PGmME | 10% | 0.4% | 77% | NEWPOL PE-108 | 16000 | 0.8% | A | AA | yes |
| Example 16 | 18.0% | TEG/2-Py | 8.0% | DEGmME | 10% | 0.9% | 56% | NEWPOL PE-108 | 16000 | 0.8% | B | AA | yes |
| Example 17 | 13.0% | TEG/2-Py | 3.0% | DEGmME | 10% | 0.9% | 77% | NEWPOL PE-62 | 2200 | 4.0% | A | AA | yes |
| Example 18 | 13.0% | TEG/2-Py | 3.0% | DEGmME | 10% | 0.9% | 77% | NEWPOL PE-62 | 2200 | 8.0% | A | A | yes |
| Comparative 1 | 13.0% | TEG/2-Py | 3.0% | DEGmME | 10% | 0.9% | 43% | glycerin | 92 | 10.0% | D | A | yes |
| Comparative 2 | 13.0% | TEG/2-Py TEGmME | 3.0% 10.0% | no addition | — | — | 0% | NEWPOL PE-108 | 16000 | 0.8% | C | A | yes |
| Comparative 3 | 13.0% | TEG/2-Py | 3.0% | DEGmME | 10% | 0.9% | 77% | NEWPOL PE-108 | 16000 | 0.8% | A | C | No |

General solvent: Refers to the water-soluble organic solvent other than the specific water-soluble organic solvent.

Weight-average molecular weight of AQUALIC DL is estimated to be 2000 or more.

As it is obvious from the Table 2 above, it was found that the Examples which use the ink, the recording medium, and the ink circulating apparatus according to the invention provided high print density and excellent ejection stability.

Reference numerals used in Figures of the invention are explained below.

10: inkjet recording apparatus; 50 (50A): recording head; 51: head unit; 52: common flow channel; 54: first supply port; 56: second supply port; 58: pressure chamber; 59: pressure chamber row; 60: supplying channel; 62: nozzle flow channel; 64: nozzle; 66: vibrating plate; 68: piezoelectric element; 69: individual electrode; 70: common circulation channel; 71: connecting flow channel; 72: reflux channel; 74: withdrawal port; 80: liquid droplet ejecting element; 100: ink tank; 102: sub-tank; 104: solvent concentration detector; 106: solvent adding unit; 108: degassing unit; 110, 130, 136: flow channel; 112, 120, 124, 132, 138: pump; 114: heater-cooler for ink temperature adjustment; 116: first flow channel, 118: second flow channel; 122, 140: filter; 134: reserve tank; 144: solvent tank; 146: vacuum pump; P1: ink pressure at first supply port 54; P2: ink pressure at second supply port 56; P3: ink pressure at withdrawal port 74

What is claimed is:

1. An inkjet recording method comprising performing recording on an inkjet recording medium having, on a support, an ink receiving layer containing at least inorganic microparticles, a water-soluble resin and a crosslinking agent, by ejecting (1) an inkjet ink containing at least a dye, water and a water-soluble organic solvent, wherein 50% by weight or more of the water-soluble organic solvent is a water-soluble organic solvent which gives a swelling ratio of 3% or less for the water-soluble resin that has been crosslinked by the crosslinking agent, using (2) an image forming apparatus equipped with an ink circulating apparatus, including:

(i) a plurality of liquid droplet ejecting elements, (ii) a common flow channel which is connected with the plurality of liquid droplet ejecting elements through respective supply channels, and (iii) a common circulation channel which is connected with the plurality of liquid droplet ejecting elements through respective reflux channels, wherein the inkjet ink is supplied from the common flow channel to the plurality of liquid droplet ejecting elements, and circulates to the common circulation channel.

2. The inkjet recording method of claim 1, wherein a total content of the water-soluble organic solvent is 5% by weight to 25% by weight relative to the total weight of the inkjet ink.

3. The inkjet recording method of claim 1, wherein the water-soluble organic solvent which gives the swelling ratio of 3% or less is at least one selected from the group consisting of 1,2-alkanediol, ethylene glycol monoalkyl ether, diethylene glycol monoalkyl ether, propylene glycol monoalkyl ether, dipropylene glycol monoalkyl ether, ethylene glycol dialkyl ether, diethylene glycol dialkyl ether, triethylene glycol dialkyl ether, propylene glycol dialkyl ether, dipropylene glycol dialkyl ether, and tripropylene glycol dialkyl ether.

4. The inkjet recording method of claim 1, wherein the inkjet ink further contains a water-soluble polymer thickening agent at a proportion of 0.01% by weight to 5% by weight relative to the total weight of the inkjet ink.

5. The inkjet recording method of claim 1, wherein the inkjet ink is ejected by being supplied from the common flow channel through the supply channels to the plurality of liquid droplet ejecting elements each having a nozzle, and the inkjet ink which is not ejected through the nozzle is circulated to the common circulation channel through each of the reflux channels.

6. The inkjet recording method of claim 1, wherein a supply amount of the inkjet ink is controlled by altering the difference in the pressure of the inkjet ink at the common flow channel and at the common circulation channel.

7. The inkjet recording method of claim 6, wherein each of the supply channels is connected with a pressure chamber which alters the difference in the pressure of the inkjet ink at the common flow channel and at the common circulation channel, and each of the reflux channels is connected to a nozzle flow channel which is connected with the pressure chamber and the nozzle.

* * * * *